(12) United States Patent
Iriyama

(10) Patent No.: US 9,280,999 B2
(45) Date of Patent: Mar. 8, 2016

(54) RECORDING APPARATUS, RECORDING METHOD AND RECORDING MEDIUM

(71) Applicant: Sony Corporation, Tokyo (JP)

(72) Inventor: Toshihisa Iriyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 1 day.

(21) Appl. No.: 13/863,508

(22) Filed: Apr. 16, 2013

(65) Prior Publication Data

US 2013/0279316 A1 Oct. 24, 2013

(30) Foreign Application Priority Data

Apr. 23, 2012 (JP) ................................. 2012-097548

(51) Int. Cl.
*G11B 7/0045* (2006.01)
*G11B 7/1263* (2012.01)
*G11B 7/24038* (2013.01)
*G11B 7/007* (2006.01)
*G11B 7/1267* (2012.01)
*G11B 7/00* (2006.01)

(52) U.S. Cl.
CPC ........ *G11B 7/00456* (2013.01); *G11B 7/00736* (2013.01); *G11B 7/1263* (2013.01); *G11B 7/1267* (2013.01); *G11B 7/24038* (2013.01); *G11B 2007/0013* (2013.01)

(58) Field of Classification Search
CPC ............. G11B 7/1263; G11B 7/00456; G11B 7/24038; G11B 7/00736; G11B 7/1267; G11B 2007/0013
USPC .......... 369/475.5, 47.51, 47.52, 47.53, 53.26, 369/116, 94, 283, 47.5
See application file for complete search history.

(56) References Cited

U.S. PATENT DOCUMENTS

| | | | | |
|---|---|---|---|---|
| 7,721,097 | B2 * | 5/2010 | Muramatsu | G11B 7/00736 369/124.03 |
| 7,791,997 | B2 * | 9/2010 | Taniguchi | G11B 7/00736 369/257 |
| 8,630,156 | B2 * | 1/2014 | Inoue | G11B 7/09 369/47.27 |
| 2003/0026189 | A1 * | 2/2003 | Richter | G11B 7/127 369/94 |
| 2005/0243688 | A1 * | 11/2005 | Schleipen | G11B 7/0953 369/125 |
| 2005/0270934 | A1 * | 12/2005 | Lee | G11B 7/00736 369/47.5 |
| 2006/0153055 | A1 * | 7/2006 | Suh | G11B 7/00736 369/275.1 |
| 2007/0159942 | A1 * | 7/2007 | Takeshita | G11B 7/00736 369/47.53 |
| 2007/0201324 | A1 * | 8/2007 | Hirono | G11B 7/131 369/44.24 |
| 2008/0062244 | A1 * | 3/2008 | Wu | G11B 7/0037 347/256 |
| 2009/0323493 | A1 * | 12/2009 | Ohkubo | G11B 7/00736 369/94 |
| 2011/0205877 | A1 * | 8/2011 | Watanabe | G11B 7/08511 369/53.23 |
| 2011/0242948 | A1 * | 10/2011 | Suzuki | G11B 1/00736 369/30.03 |

FOREIGN PATENT DOCUMENTS

JP 2011-150751 A 8/2011

* cited by examiner

*Primary Examiner* — Thomas Alunkal
(74) *Attorney, Agent, or Firm* — Sony Corporation

(57) ABSTRACT

A recording apparatus includes a recording unit that performs a recording operation to each layer by performing laser light illumination to a recording medium which has (n+1) or more layers as a recording layer and in which a test writing area of each layer is formed between at least n consecutive layers and at a position in which the test writing areas are not overlapped with each other when seen from a laser light incident surface side, and a controller that sets the n consecutive layers to be a recording target layer in the recording operation including a test writing for laser power adjustment and causes the recording unit to execute the recording operation to the n recording target layers, wherein n≥2.

17 Claims, 20 Drawing Sheets

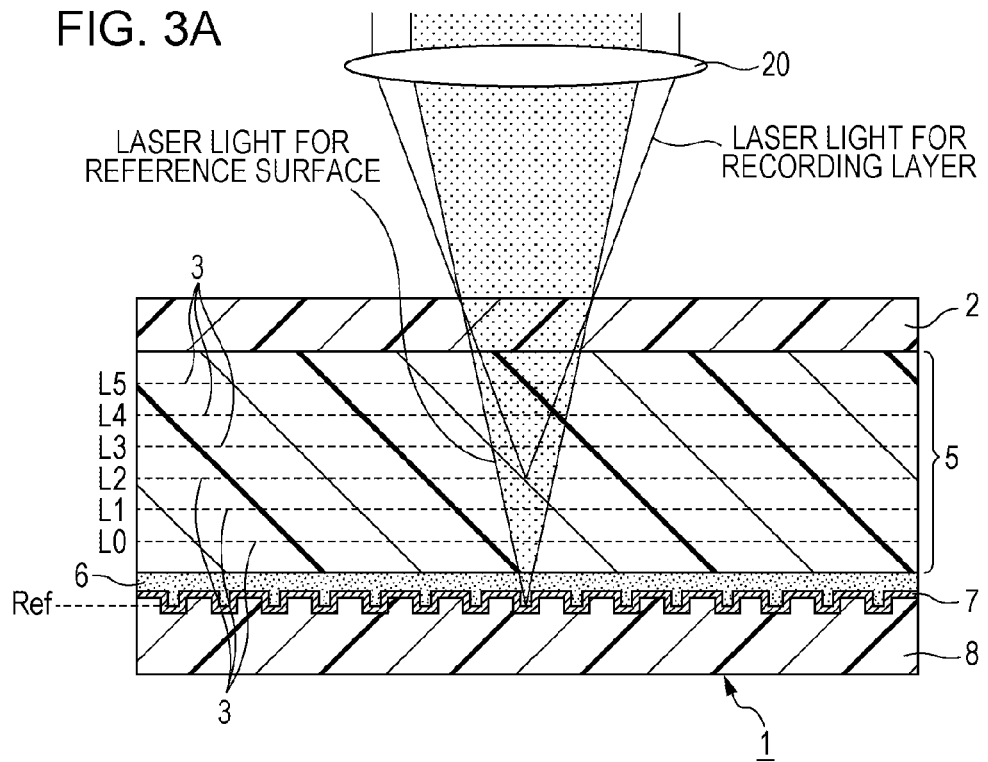
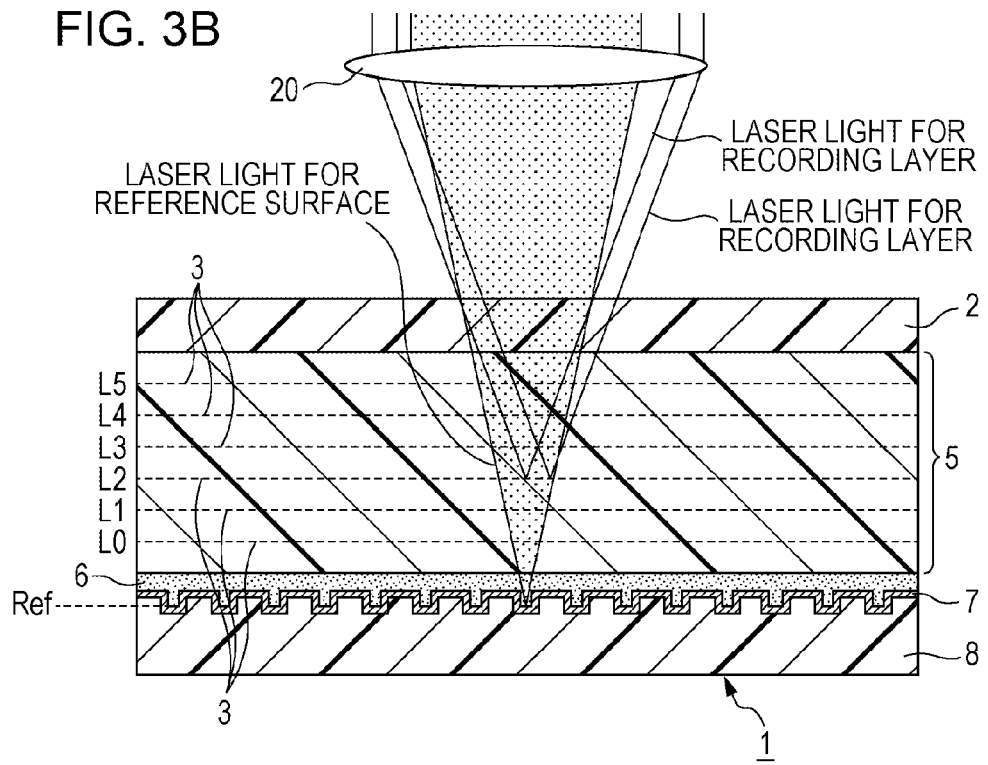

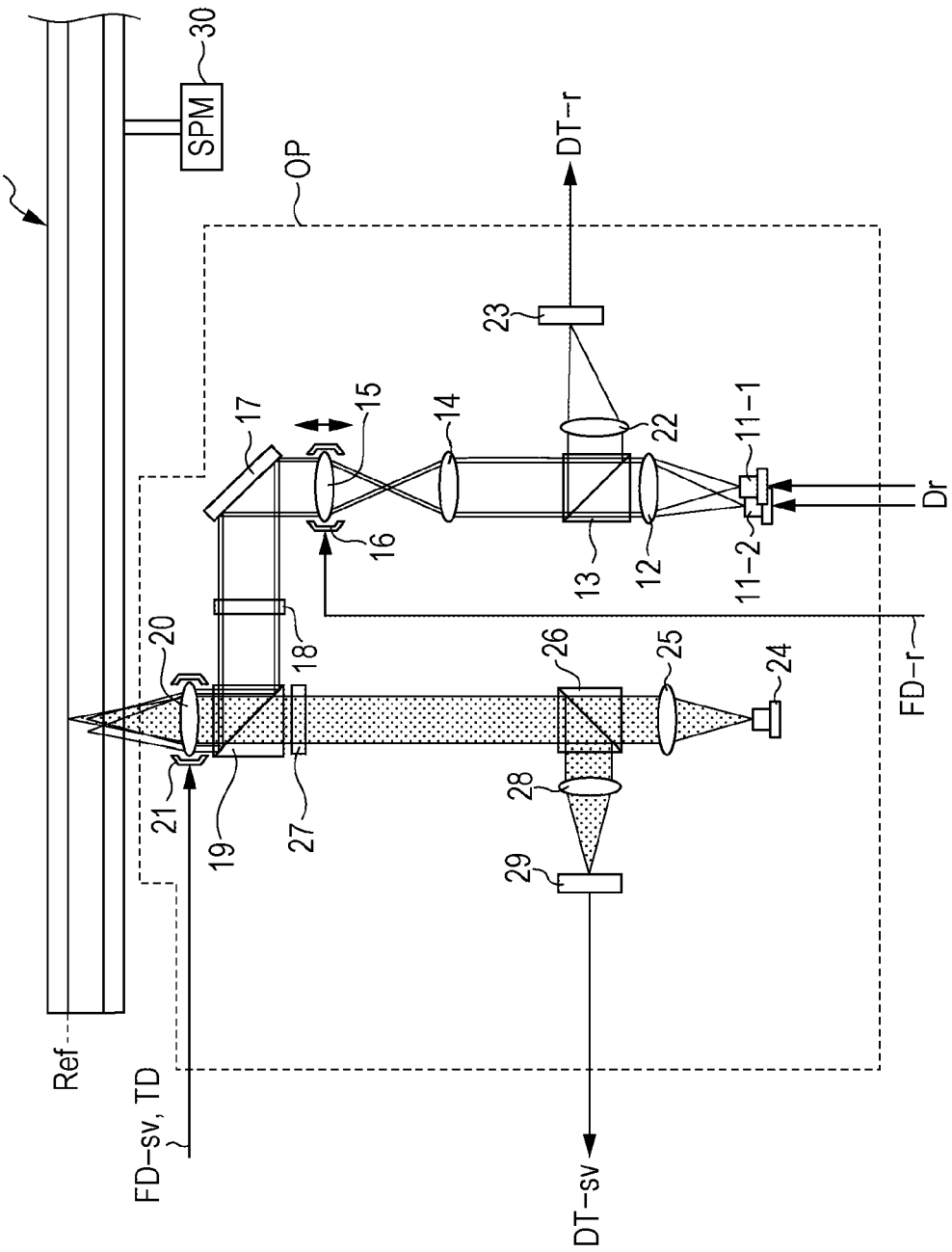

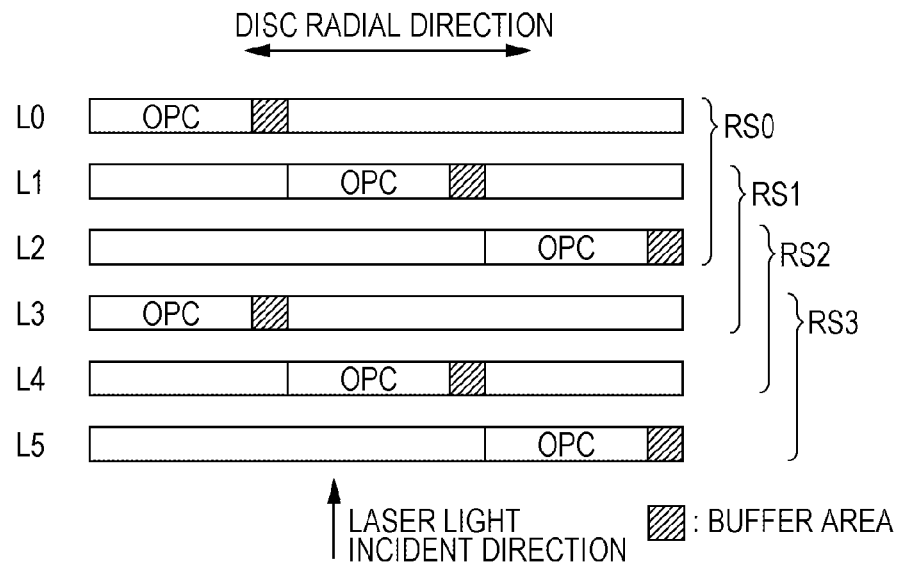
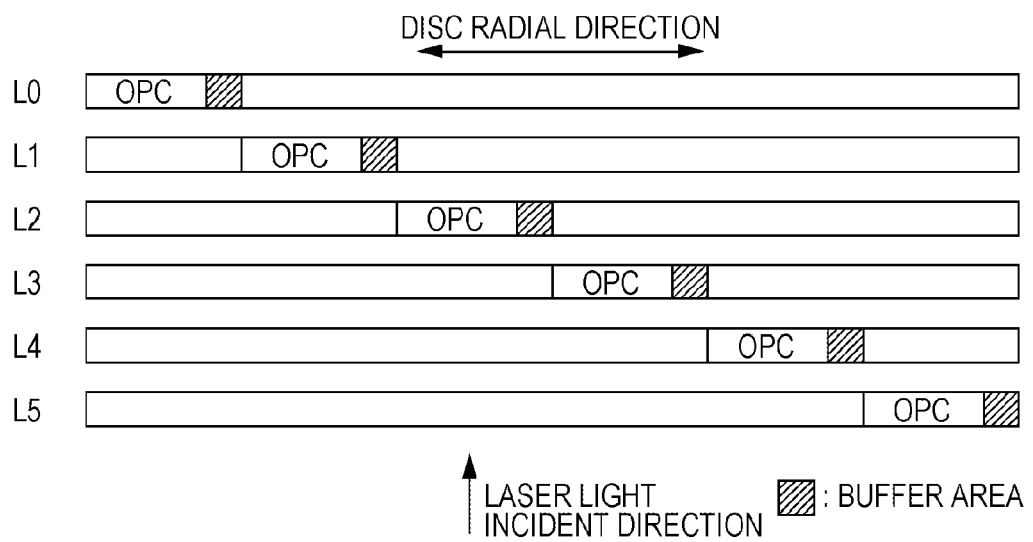

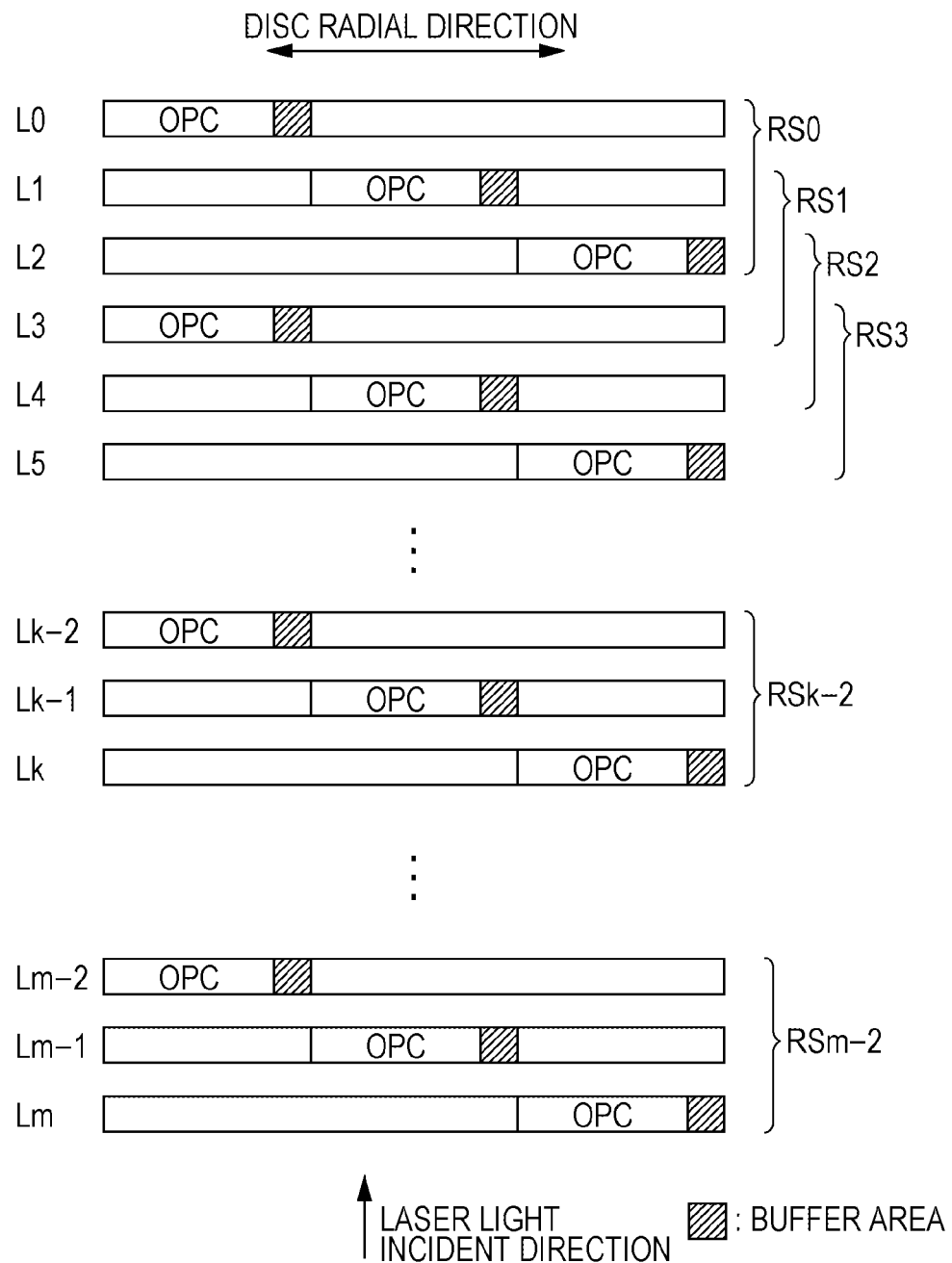

RECORDING APPARATUS, RECORDING METHOD AND RECORDING MEDIUM

BACKGROUND

The present disclosure relates to a recording apparatus, a recording method and a recording medium. Particularly, the present disclosure relates to a recording medium in which a test writing area for laser power adjustment is provided in each recording layer and to a recording operation thereto.

As an optical recording medium in which recording or reproducing signals is performed by light illumination, for example, a so-called optical disc recording medium (hereinafter, simply referred to as an optical disc) such as a CD (Compact Disc), a DVD (Digital Versatile Disc), and a BD (Blu-ray Disc: registered trademark) has been widely used.

In the related art, for an optical disc, by improving the information recording density thereof, increase in the recording capacity thereof has been achieved. Specifically, a method for reducing a formation pitch of a track such as a pit row or a mark row, that is, for improving the recording density in a radial direction of the optical disc and a method for improving the recording density in the linear direction (direction orthogonal to the radial direction) by reducing the size of pits or marks have been used.

On the other hand, in order to increase the recording capacity, a method of increasing the number of recording layers (recording surfaces) is also effective and, under present circumstances, a multi-layer disc, such as a two-layer disc or three-layer or more disc, has also been proposed and practically used.

Japanese Unexamined Patent Application Publication No. 2011-150751 is an example of the related art documents.

SUMMARY

In a case of a multi-layer disc, in order to optimize a recording operation in each recording layer, an OPC area (Optimum Power Control area: test writing area) is provided. By performing test writing by various recording laser power using the OPC area, an optimum recording laser power is determined. When the actual recording of user data or the like is performed, an optimum recording laser power is determined by the test writing using the OPC area and then laser light illumination is performed by using the determined optimum recording laser power.

When the multilayered structure of a disc makes progress and thus the number of recording layers increases, each recording layer has a different optimum laser power condition. Therefore, it is preferable that the OPC area be provided in each recording layer and the recording operation be carried out to each recording layer by performing the test writing to the recording layer and then obtaining an optimum power condition thereof.

However, when an OPC operation is performed at an OPC area of a certain recording layer, it is necessary to set a portion which is overlapped with the OPC area of the recording layer closer to the laser light incident surface side than the certain recording layer (portion through which the laser light passes) to be in unused state.

For example, if OPC areas of respective recording layers are arranged to be overlapped with each other in a laser light axis direction (disc thickness direction), it is possible to use the OPC areas only from the OPC area of the recording layer as the depth side. Accordingly, the OPC operation of the recording layer at the front side is restricted and the degree of freedom in the recording operation is largely interfered with.

In this case, it is preferable that all OPC areas of the respective recording layers be arranged at a position where the OPC areas are not overlapped with each other in the disc thickness direction. However, as the number of the recording layers increases, areas which have to be secured as the OPC area increase. Therefore, this fact restricts the recording capacity of user data or the like.

It is desirable to efficiently arrange the OPC areas and particularly, to maintain the degree of freedom in the recording operation to each recording layer without the OPC areas oppressing a recording capacity even in a case where the multilayered structure of a disc makes progress.

According to an embodiment of the present disclosure, there is provided a recording apparatus including: a recording unit that performs a recording operation to each layer by performing laser light illumination to a recording medium which has (n+1) or more layers (here, n≥2) as a recording layer and in which a test writing area of each layer is formed between at least n consecutive layers and at a position in which the test writing areas are not overlapped with each other when seen from a laser light incident surface side; and a controller that sets the n consecutive layers to be a recording target layer in the recording operation including a test writing for laser power adjustment and causes the recording unit to execute the recording operation to the n recording target layers.

According to another embodiment of the present disclosure, there is provided a recording method for a recording medium which has (n+1) or more layers (here, n≥2) as a recording layer and in which a test writing area of each layer is formed between at least n consecutive layers and at a position in which the test writing areas are not overlapped with each other when seen from a laser light incident surface, including: in a state where the n consecutive layers are set to be a recording target layer, executing a recording operation by performing laser light illumination including a test writing for laser power adjustment to the n recording target layers.

According to still another embodiment of the present disclosure, there is provided a recording medium in which recording is performed to n consecutive layers of recording layers as a recording target layer in a recording operation including a test writing for laser power adjustment, the recording medium including: (n+1) or more layers (here, n≥2), wherein a test writing area is provided in each layer, and wherein the test writing area of each layer is formed between at least n consecutive layers and at a position in which the test writing areas are not overlapped with each other when seen from a laser light incident surface side.

According to the embodiments of the present disclosure, the fact that the test writing area of each layer of the recording medium is formed between at least n consecutive layers and at a position in which the test writing areas are not overlapped with each other when seen from the laser light incident surface side means that the test writing areas between at least n layers may be displaced. That is, there is no necessity that the test writing areas of all (n+1) or more layers are arranged not to be overlapped with each other.

In this case, as the recording operation, recording is performed to n consecutive layers as a recording target layer. In the n layers, the OPC operation is not interfered by the OPC operation of other layers.

According to the embodiments of the present disclosure, the test writing areas of n layers may be arranged not to be overlapped with each other in the laser light axis direction. When the multilayered structure of a disc makes progress, it is possible to prevent the test writing areas from expanding with no limitation. Moreover, during the recording operation, the use of the test writing areas between the n layers is not restricted and there is no problem in the recording operation. According to this, increase in the recording capacity and maintaining the degree of freedom in recording are compatible with respect to the multi-layer recording medium and the recording operation thereto.

BRIEF DESCRIPTION OF THE DRAWINGS

FIGS. 3A and 3B are views illustrating a servo operation to the optical disc according to the embodiment;

FIG. 4 is a view illustrating a configuration of an optical system of a recording and reproduction apparatus according to the embodiment;

FIGS. 7A and 7B are views illustrating an example of the OPC area arrangement of a six-layer disc according to the embodiment;

FIG. 8 is a view illustrating an example of the OPC area arrangement of a (m+1)-layer disc according to the embodiment;

DETAILED DESCRIPTION OF EMBODIMENTS

Figure 1:
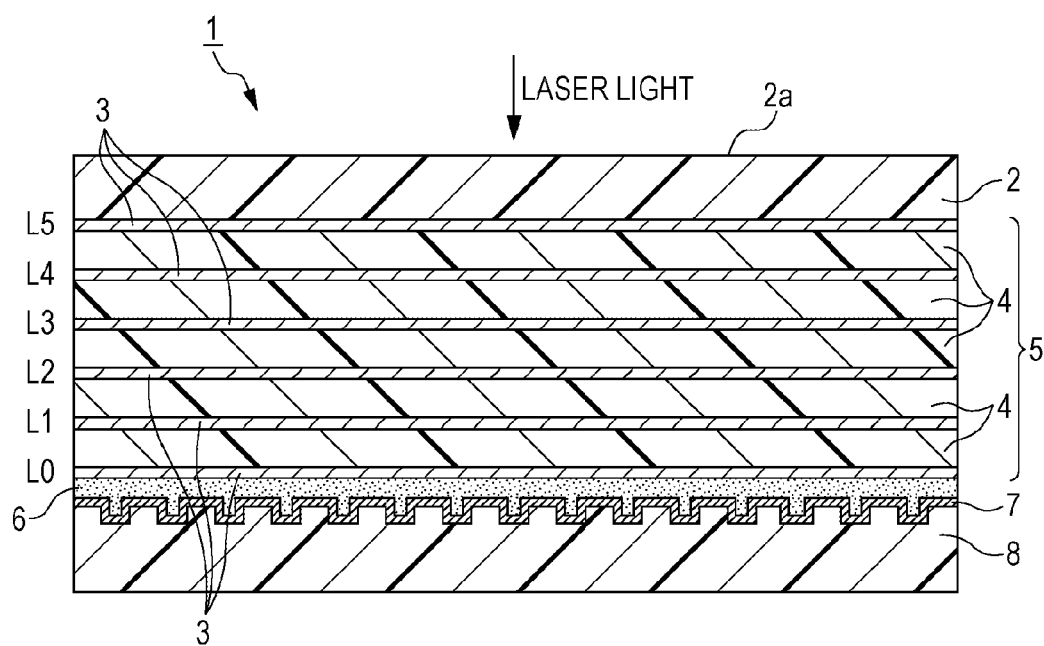
FIG. 1 is a view illustrating a layer structure of an optical disc according to an embodiment of the present disclosure.

Hereinafter, embodiments of the present disclosure will be described in the following order.
1. Recording Medium
2. Position Control Method Using Reference Surface
3. Recording and Reproduction Apparatus
4. OPC Area Structure
5. First Example of Recording Process
6. Second Example of Recording Process
7. Modification Example 1. Recording Medium FIG. 1 shows a cross-sectional structure of a multi-layer recording medium 1 as a recording medium according to an embodiment of the present disclosure. The multi-layer recording medium 1 is implemented as an optical disc having a diameter of about 12 cm and a thickness of about 1.2 mm similar to a CD, a DVD, and a BD. FIG. 1 schematically shows the cross-sectional structure thereof in a thickness direction.

As shown in FIG. 1, on the multi-layer recording medium 1, a cover layer 2, a recording layer formation area 5 on which a plurality of recording layers 3 are formed, an adhesion layer 6, a reflection film 7, and a substrate 8 are formed in this order from the upper layer side in the drawing.

Herein, a surface on which laser light is incident from a recording and reproduction apparatus 10 described later is the cover layer 2 side. The laser light incident surface 2a is the surface of the cover layer 2. In the above description, based on a laser light incident direction, the laser light incident surface 2a side is referred to as a "front side" and the substrate 8 side is referred to as a "depth side".

In the multi-layer recording medium 1, the cover layer 2 is formed of, for example, resin and functions as a protection layer of the recording layer formation area 5 which is formed at the depth side.

As shown in the drawing, the recording layer formation area 5 is configured to have the plurality of recording layers 3 and intermediate layers 4 interposed between the plurality of recording layers 3. That is, in this case, the recording layer formation area 5 is formed by repeatedly laminating the recording layer 3→the intermediate layer 4→the recording layer 3→the intermediate layer 4 . . . →the recording layer 3.

The recording layer 3 is formed of a semi-transparent recording film. The intermediate layer 4 is formed of, for example, resin materials such as thermoplastic resin and ultraviolet curable resin.

In the drawing, six recording layers 3 are formed on the recording layer formation area 5 but this is merely an example. The number of the recording layers 3 may be any number other than "6".

The respective recording layers 3 are referred to as layers L0, L1, L2 . . . in the order from the depth side when seen from the laser light incident surface 2a. Since a six-layer structure is shown in this example, layers L0 to L5 are formed as the recording layers 3.

Herein, in the recording layer formation area 5, as it is clearly understood from the drawing, in each recording layer 3, a position guiding element (concave and convex pattern) according to the formation of grooves, a pit row, or the like is not formed. That is to say, each recording layer 3 is formed in a planar shape.

In the formation of this recording layer formation area 5, the formation process of the position guiding element for each recording layer may be not necessary for manufacturing the present multi-layer disc. Therefore, it is possible to effectively reduce the manufacturing cost and mass-producing cost of the multi-layer recording medium 1.

The fact that the recording layer 3 is a planar shape means that address information or the like by the concave and convex pattern is not formed on the recording layer 3 in advance.

When recording information, that is, recording user data or management information which is main information, the address information is recorded on the recording layer 3 according to the main information recording. In other words, in main data (main data for recording such as user data and management information), the address information is embedded and encoded, and the encoded recording data is recorded.

In the recording layer 3, tracks are formed according to a recording operation.

Figure 2A:
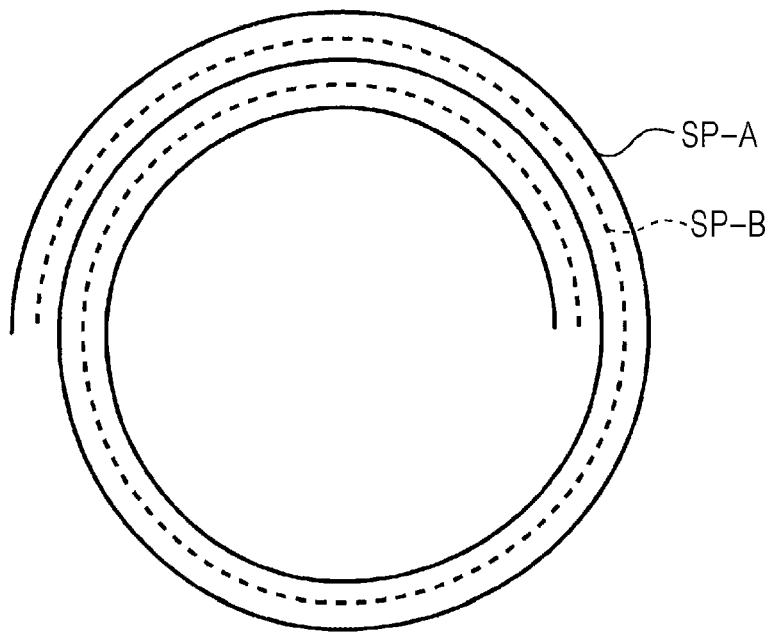
FIGS. 2A and 2B are views illustrating a track structure of the optical disc according to the embodiment.
Figure 2B:
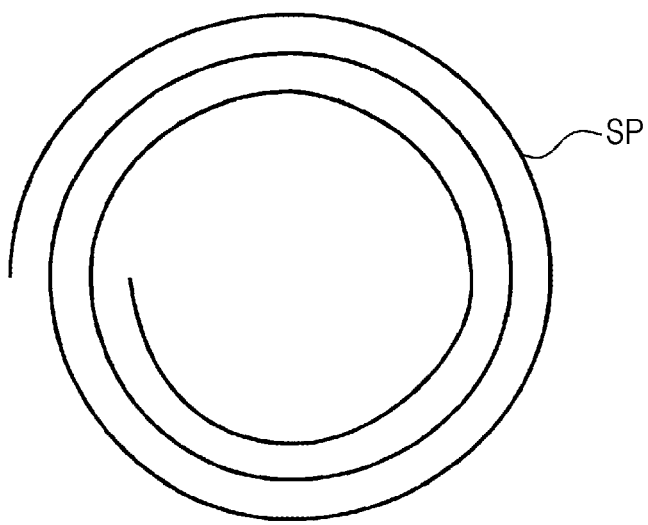

An example in which the tracks are formed in a double spiral shape as shown in FIG. 2A or an example in which the tracks are formed in a single spiral shape as shown in FIG. 2B may be considered. The single spiral-shaped tracks are the same tracks as the CD, the DVD or the like described above.

The double spiral-shaped tracks are that two spiral tracks SP-A and SP-B are formed as shown by a solid line and a broken line in FIG. 2A.

The double spiral-shaped track structure may be formed by, for example, a method in which the spiral tracks are simultaneously formed by two recording beams or a method in which a single spiral track SP-A is formed by a single recording beam at a certain track pitch and thereafter the second spiral track SP-B is formed between the tracks.

In addition, herein, the double spiral tracks have been exemplified, but a track structure in which spiral tracks are multiplexed, such as triple spiral tracks and quadruple spiral tracks, may be considered.

As shown in FIG. 1, the reflection film 7 is formed at the depth side from the recording layer formation area 5, through the adhesion layer 6 (intermediate layer) formed of desired adhesive materials.

The position guiding element to guide recording and reproduction positions is formed on the reflection film 7. The fact that the position guiding element is formed on the reflection film means that the reflection film is formed on an interfacial surface on which the position guiding element is formed.

Specifically, in this case, by forming the position guiding element on one surface side of the substrate 8 in the drawing, a concave and convex cross-sectional shape as shown in the drawing is provided. The reflection film 7 is formed on the surface of the substrate 8 on which the concave and convex cross-sectional shape is provided. According to this, the position guiding element is formed on the reflection film 7.

In addition, the substrate 8 is formed of, for example, resin such as polycarbonate. The substrate 8 may be formed by, for example, injection molding using a stamper in which the concave and convex cross-sectional shape is provided as the position guiding element.

Herein, in a similar way to the present recordable optical disc, by forming the position guiding element, the address information, which represents an absolute position in a direction parallel to the inside direction of the recording surface of the multi-layer recording medium 1, may be recorded. For example, when the position guiding element is formed by using the groove, the absolute position information may be recorded by the modulation of the meandering (wobble) period of the grooves, whereas when the position guiding element is formed by using the pit row, the absolute position information may be recorded by the modulation of the pit length or a formation interval of pits.

As described above, the position guiding element is not formed on the recording layer 3 and, as described below, the recording position on the recording layer 3 is controlled on the basis of reflective light from the reflection film 7 on which the position guiding element is formed.

In this sense, hereinafter, the reflection film 7 (reflection surface) on which the position guiding element is formed is referred to as a "reference surface Ref". In addition, in order to differentiate address information, which is recorded on the reference surface Ref using a concave and convex pattern, from an address to be recorded on the recording layer 3, the address information is referred to as a "reference surface address". Further, the address, which is recorded on the recording layer 3 with the main information, is referred to as a "recording layer address".

Since the position guiding element is not formed on the recording layer 3, as described above, it is possible to manufacture a multi-layer recording medium without cost increases. However, in this case, in order to appropriately get access to the recording layer 3 which does not have any address, the reference surface Ref is provided in a state where the reference surface Ref and the recording layer 3 are laminated. In the reference surface Ref, an address is formed in advance by using a concave and convex pattern such as a wobbling groove and a pit row. In this way, depending on the address of the reference surface Ref, it is possible to get access to a desired position on the multi-layer recording medium 1, and then to record information (user data or management data) on the recording layer 3 or to reproduce the information, at the desired position.

2. Position Control Method Using Reference Surface

FIGS. 3A and 3B are views illustrating a position control method using the position guiding element which is formed on the reference surface Ref.

In order to realize the position control of laser light for a recording layer which is expected to illuminate the recording layer 3 as a target, in addition to the laser light for a recording layer, laser light for performing the position control based on the position guiding element on the reference surface Ref (hereinafter, referred to as laser light for a reference surface) illuminates the multi-layer recording medium 1 having the above-described configuration.

Specifically, as shown in FIG. 3A, the laser light for a recording layer and the laser light for a reference surface illuminate the multi-layer recording medium 1 via an objective lens 20.

At this time, in order to realize an accurate tracking servo, the optical axis of the laser light for a recording layer is aligned with the optical axis of the laser light for a reference surface.

During recording marks on the recording layer 3 (desired semi-transparent recording film) as a target, as shown in FIG. 3A, the laser light for a reference surface illuminates the reflection surface (reference surface Ref) of the reflection film 7 so as to be condensed and then the position control of the objective lens 20 is performed in response to a tracking error signal which is obtained on the basis of the reflective light thereon. That is to say, tracking servo is performed.

According to this, it is possible to control the position, in which is illuminated with the laser light for a recording layer in a tracking direction via the same objective lens 20, to be a desired position.

Meanwhile, the position control during reproduction may be realized as follows.

During reproduction, since mark rows (that is, already-recorded tracks) are formed on the recording layer 3, it is possible to perform the tracking servo to the mark rows as a target using the laser light for a recording layer alone. In other words, the tracking servo during reproduction may be realized by performing the position control of the objective lens 20 in response to the tracking error signal which is obtained on the basis of the reflective light of the laser light for a recording layer.

Herein, in the above-described position control method, when light having the same wavelength band as the laser light for a recording layer is used as the laser light for a reference surface, reflectance of the laser light for a recording layer has to increase in the reference surface Ref in which the reflective light of the laser light for a references surface is expected to be received. That is, stray light components increase by the increase in the reflectance and thus there is a concern for remarkably degrading reproduction properties.

To address this circumstance, the laser light for a reference surface and the laser light for a recording layer, which have different wavelength bands from each other, are used and a reflection film having wavelength selectivity is used as the reflection film 7 which forms the reference surface Ref.

Specifically, in this example, the wavelength of the laser light for a recording layer is considered as approximately 405 nm similar to the BDs and the wavelength of the laser light for a reference surface is considered as approximately 650 nm similar to the DVDs. As the reflection film 7, a wavelength selectivity reflection film, which selectively reflects light having the same wavelength band as the laser light for a reference surface and transmits or absorbs light having other wavelengths, is used.

According to this configuration, it is possible to prevent unnecessary reflective light components of the laser light for a recording layer from being generated from the reference surface Ref and to secure a good S/N (signal-to-noise ratio).

FIG. 3B shows an example of illumination of two laser light beams as the laser light for a recording layer. The illumination of two laser light beams for a recording layer is performed, for example, in a case where double spiral-shaped tracks are simultaneously recorded or reproduced or a case where adjacent track servo (ATS) in which adjacent tracks are recorded along tracks having already been recorded on the recording layer 3 is employed regardless of double spiral-shaped tracks or single spiral-shaped tracks.

Briefly described, in the ATS, one of the two laser light beams for a recording layer is set to be a spot for recording and the other thereof is set to be a spot for a servo. Moreover, the ATS means that tracks adjacent to the track to be illuminated with the spot for the servo are recorded using the spot for recording, while the spot for the servo illuminates the track having already been recorded (for example, at the time before the first cycle) and thus the tracking servo is performed.

When the ATS is employed, during recording, it may not be necessary to perform the tracking servo using the reference surface Ref. However, at the time of seeking up to a recording start position, it is necessary to perform the tracking using the reference surface Ref or to read an address.

Although the detailed description is not given, practically, during the ATS execution, the servo control tends to be inaccurate due to the accumulation of error components, in many cases. To address this circumstance, during the ATS execution, the servo operation correction is also performed by using information of the reference surface Ref. According to this, during recording in a case where the ATS method is employed, the reference surface Ref is also used for the tracking control.

3. Recording and Reproduction Apparatus

Subsequently, with reference to FIG. 4 and FIG. 5, the configuration of the recording and reproduction apparatus 10 according to the embodiment will be described.

The recording and reproduction apparatus 10 according to the embodiment has a reproduction function in addition to a recording function with respect to an optical disc as the multi-layer recording medium 1.

FIG. 4 is a view mainly illustrating an optical system configuration which the recording and reproduction apparatus 10 has. Specifically, FIG. 4 mainly shows an internal configuration of an optical pickup OP which the recording and reproduction apparatus 10 has.

In addition, herein, as shown in FIG. 3B, a configuration example in which the laser light for a reference surface is outputted in addition to outputting two laser light beams as the laser light for a recording layer will be described.

In a case of the method described in FIG. 3A, it may be understood that two systems of the laser light for a recording layer become one system.

First, the multi-layer recording medium 1 loaded on the recording and reproduction apparatus 10 is set such that the center hole thereof is clamped at a predetermined position of the recording and reproduction apparatus 10. The multi-layer recording medium 1 is rotatably driven by a spindle motor 30 in the drawing.

The optical pickup OP is provided in the recording and reproduction apparatus 10, as a configuration in which the laser light for recording and reproduction illuminates the multi-layer recording medium 1 rotatably driven by the spindle motor 30.

In the optical pickup OP, lasers 11-1 and 11-2 for a recording layer, which are the source of the laser light for a recording layer, are provided.

In addition, a laser 24 for a reference surface, which is the source of the laser light for a reference surface that is a light for performing the position control using the position guiding element formed on the reference surface Ref and the reading of the reference surface address, is provided.

In the optical pickup OP, an objective lens 20, which is output terminals of the laser light for a recording layer and the laser light for a reference surface to the multi-layer recording medium 1, is provided. Moreover, a light sensing unit 23 for a recording layer, which senses the reflective light of the laser light for a recording layer from the multi-layer recording medium 1, and a light sensing unit 29 for a reference surface, which senses the reflective light of the laser light for a reference surface from the multi-layer recording medium 1, are provided.

In the optical pickup OP, an optical system is formed to guide the laser light for a recording layer to the objective lens 20 and to guides the reflective light incident onto the objective lens 20 from the multi-layer recording medium 1, to the light sensing unit 23 for a recording layer.

Regarding to the two systems of the laser light for a recording layer, for example, during recording, one system is used as the laser light for recording and the other system is used as the laser light for ATS servo.

Moreover, during reproduction, both of the laser light beams are used for the laser light for reproducing and thus it is also possible to simultaneously reproduce each spiral of the double spiral-shaped tracks.

However, the usage of two systems of the laser light is not limited thereto. For example, during recording, both of the two laser light beams for a recording layer are used for recording and thus it is possible to simultaneously form the double spiral-shaped tracks.

Furthermore, herein, a configuration example in which one optical pickup OP is provided will be described but a configuration example in which the recording and reproduction apparatus 10 includes a plurality of optical pickups OP is naturally considered. In this case, various roles (using methods) of one or two systems of the laser light for a recording layer in each optical pickup OP may be considered.

According to the example of FIG. 4, an optical system for the laser light for a recording layer will be described in detail.

The two systems of the laser light for a recording layer emitted from the lasers 11-1 and 11-2 for a recording layer are converted into parallel light via a collimation lens 12 as shown in the drawing and thereafter the converted light is incident on a polarizing beam splitter 13.

The polarizing beam splitter 13 is configured to transmit the laser light for a recording layer incident from the light source side as described above.

The laser light for a recording layer having passed through the polarizing beam splitter 13 is incident on a focus mechanism which is configured to include a fixed lens 14, a movable lens 15 and a lens driving unit 16. The focus mechanism is provided to adjust a focal position of the laser light for a recoding layer. A side close to the lasers 11-1 and 11-2 for a recording layer is considered as the fixed lens 14. The movable lens 15 is disposed at a side far from the lasers 11-1 and 11-2 for a recording layer and the movable lens 15 side is driven in the direction parallel to a laser optical axis by the lens driving unit 16.

The laser light for a recording layer traveling the fixed lens 14 and the movable lens 15 which are included the focus mechanism is reflected by a mirror 17 and then incident on a dichroic prism 19 via a quarter-wave plate 18.

A selective reflection surface of the dichroic prism 19 is configured to reflect light having the same wavelength band as that of the laser light for a recording layer and transmit light having other wavelengths. Therefore, the laser light for a recording layer incident as described above is reflected by the dichroic prism 19.

The laser light for a recoding layer reflected by the dichroic prism 19 illuminates (is condensed on) the multi-layer recording medium 1 (target recording layer 3) via the objective lens 20 as shown in the drawing.

For the objective lens 20, a biaxial actuator 21 is provided which holds the objective lens 20 to be displaced in a focus direction (a direction to approach and be distant from the multi-layer recording medium 1) and in a tracking direction (a direction orthogonal to the focus direction: a disc radial direction).

The biaxial actuator 21 includes a focus coil and a tracking coil and displaces the objective lens 20 in the focus direction and the tracking direction as driving signals (driving signals FD-sv and TD described later) are given to the respective coils.

Herein, as the laser light for a recording layer illuminates the multi-layer recording medium 1 as described above, the reflective light of the laser light for a recording layer is obtained from the multi-layer recording medium 1 (recording layer 3 as a reproduction target).

The reflective light of the laser light for a recording layer is guided to the dichroic prism 19 via the objective lens 20 and is reflected by the dichroic prism 19.

The reflective light of the laser light for a recording layer reflected by the dichroic prism 19 is incident on the polarizing beam splitter 13 via the quarter-wave plate 18→the mirror 17→the focus mechanism (the movable lens 15→the fixed lens 14).

The reflective light of the laser light for a recording layer incident on the polarizing beam splitter 13 is transmitted through the quarter-wave plate 18 twice in the forward path and return path. According to this, the polarizing direction thereof is rotated by 90 degrees compared with the forward path light. As a result, the reflective light of the laser light for a recording layer incident on the polarizing beam splitter 13 as described above is reflected by the polarizing beam splitter 13.

The reflective light of the laser light for a recording layer reflected by the polarizing beam splitter 13 is condensed on the light sensing surface of the light sensing unit 23 for a recording layer via a condenser lens 22.

Hereinafter, light sensing signals obtained by the light sensing unit 23 for a recording layer sensing the reflective light of the laser light for a recording layer are denoted by a light sensing signal DT-r.

In the optical pickup OP, an optical system is formed to guide the laser light for a reference surface emitted from the laser 24 for a reference surface to the objective lens 20 and to guide the reflective light of the laser light for a reference surface from the multi-layer recording medium 1 incident on the objective lens 20, to the light sensing unit 29 for a reference surface.

As shown in the drawing, the laser light for a reference surface emitted from the laser 24 for a reference surface is converted into parallel light via a collimation lens 25 and thereafter is incident on a polarizing beam splitter 26. The polarizing beam splitter 26 is configured to transmit the laser light for a reference surface (forward path light) incident from the laser 24 for a reference surface as illustrated above.

The laser light for a reference surface transmitting the polarizing beam splitter 26 is incident on the dichroic prism 19 via a quarter-wave plate 27.

As described above, since the dichroic prism 19 is configured to reflect light having the same wavelength band as that of the laser light for a recording layer and transmit light having other wavelengths, the laser light for a reference surface is transmitted through the dichroic prism 19 and illuminates the multi-layer recording medium 1 (reference surface Ref) via the objective lens 20.

The reflective light of the laser light for a reference surface (the reflective light from the reference surface Ref) which is obtained as the laser light for a reference surface illuminates the multi-layer recording medium 1 as described above is transmitted through the dichroic prism 19 via the objective lens 20 and is then incident on the polarizing beam splitter 26 via the quarter-wave plate 27.

As described above, since the reflective light of the laser light for a reference surface incident from the multi-layer recording medium 1 side is transmitted through the quarter-wave plate 27 twice in the forward path and return path, the polarizing direction thereof is rotated by 90 degrees compared with the forward path light. Therefore, the reflective light of the laser light for a reference surface is reflected by the polarizing beam splitter 26.

The reflective light of the laser light for a reference surface reflected by the polarizing beam splitter 26 is condensed on the light sensing surface of the light sensing unit 29 for a reference surface via a condenser lens 28.

Hereinafter, light sensing signals obtained by the light sensing unit 29 for a reference surface sensing the reflective light of the laser light for a reference surface are denoted by a light sensing signal DT-sv.

Herein, since, in the multi-layer recording medium 1, the reference surface Ref is provided at the depth side from the recording layer formation area 5 as shown in FIG. 1, during recording, the focus servo control of the objective lens 20 is performed such that the laser light for a reference surface is condensed on the reference surface Ref provided at the depth side from the recording layer formation area 5 as shown in the drawing. Furthermore, for the laser light for a recording layer, by driving the above-described focus mechanism (lens driving unit 16) by the focus servo control based on the reflective light of the laser light for a recording layer, the collimation state of the laser light for a recording layer which is incident on the objective lens 20 is adjusted such that the laser light for a recording layer is condensed on the recording layer 3 which is formed at the front side from the reference surface Ref.

The tracking servo control of the laser light for a recording layer during reproduction is carried out by causing the spot of the laser light for a recording layer to follow the mark rows formed on the recording layer 3 as a reproduction target. That is, the tracking servo control of the laser light for a recording layer during reproduction is realized by controlling a position of the objective lens 20 based on the reflective light of the laser light for a recording layer.

In addition, the focus servo control during reproduction may be the same as the focus servo control during recording.

Figure 5:
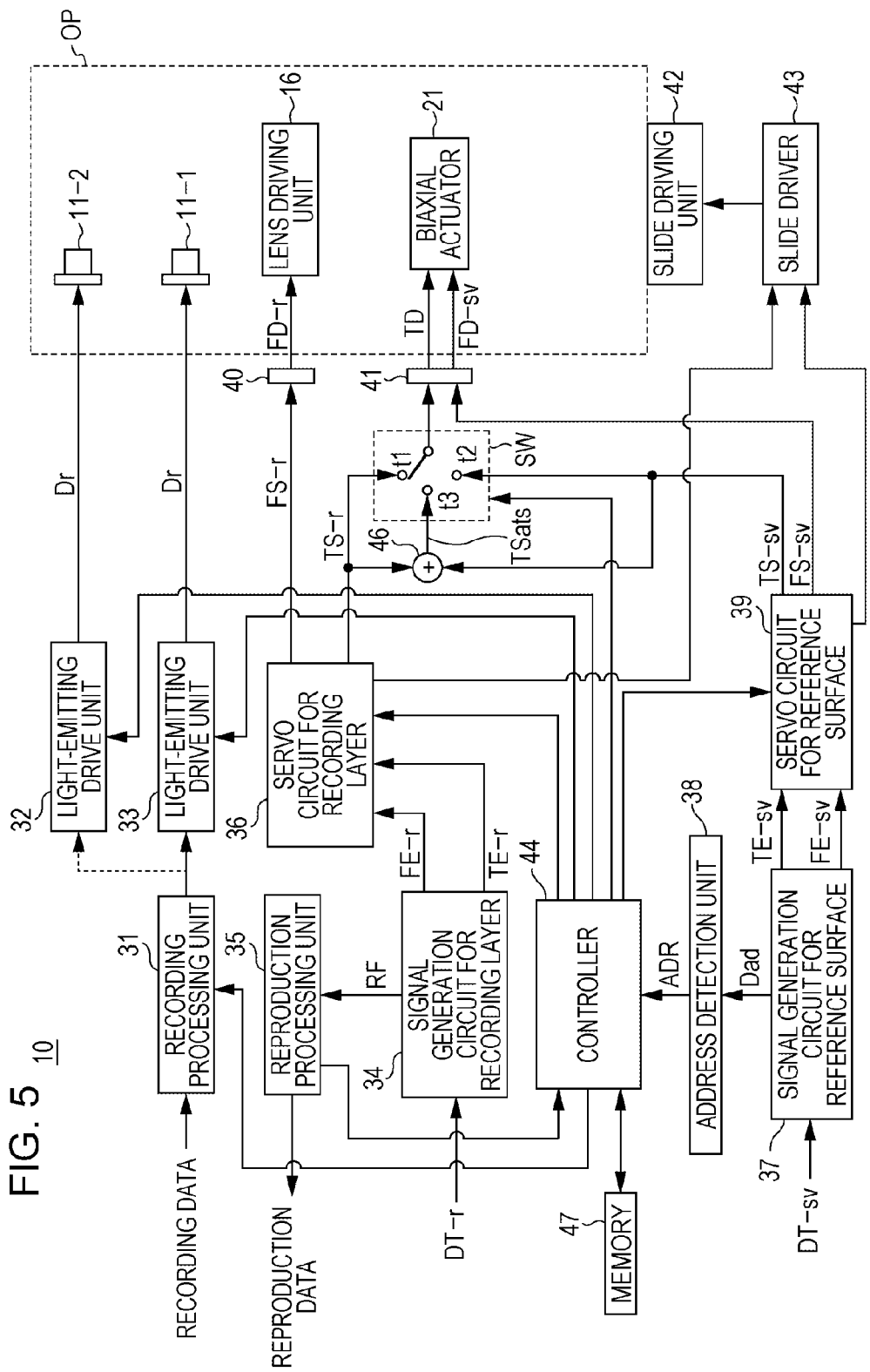
FIG. 5 is a block diagram of the recording and reproduction apparatus according to the embodiment.

FIG. 5 illustrates the internal configuration of the entire recording and reproduction apparatus 10 according to the embodiment.

In addition, in FIG. 5, only the lasers 11-1 and 11-2 for a recording layer, the lens driving unit 16, and the biaxial actuator 21 are extracted from the configuration shown in FIG. 4 to be illustrated in the internal configuration of the optical pickup OP.

Moreover, in the drawing, the illustration of the spindle motor 30 shown in FIG. 4 is omitted.

In FIG. 5, as a configuration in which recording and reproduction are performed to the recording layer 3 in the multi-layer recording medium 1 as a target or focus and tracking position controls are performed based on the reflective light from the recording layer 3, a recording processing unit 31, a light-emitting drive unit 32, a light-emitting drive unit 33, a signal generation circuit 34 for a recording layer, a reproduction processing unit 35, a servo circuit 36 for a recording layer, a focus driver 40, and a biaxial driver 41 are provided outside the optical pickup OP in the recording and reproduction apparatus 10.

The recording processing unit 31 generates a recording modulation code in accordance with recording data to be inputted. Specifically, the recording processing unit 31 performs addition of an error correction code to the input recording data, a predetermined recording modulation encoding process, and the like, thereby obtaining a recording modulation code row which is a binary data row of, for example, "0" and "1" to be actually recorded on the recording layer 3 as a target.

At this time, the recording processing unit 31 also performs an addition process of address information (recording layer address) to the recording data in response to an instruction from a controller 44 described later.

The recording processing unit 31 gives a recording signal based on the generated recording modulation code row to one of the light-emitting drive units 33 and 32 or both thereof.

For example, when the ATS (Adjacent Tracking Servo) is executed in order to form single spiral-shaped or double spiral-shaped tracks, during recording, the recording is performed using one of the two systems of the laser light beams for a recording layer and the tracking to the adjacent track is performed by reproduction power using the other thereof. According to this, the recording signal generated by the recording processing unit 31 is given to only the light-emitting drive unit 33. The light-emitting drive unit 33 generates a laser driving signal Dr based on a recording signal inputted by the recording processing unit 31 during recording and drives the laser 11-1 for a recording layer based on the driving signal Dr to emit light. According to this, it is possible to record the mark rows corresponding to the recording data to the recording layer 3.

At this time, the light-emitting drive unit 32 drives the laser 11-2 for a recording layer by reproduction power to emit light.

For example, while the tracking control is performed using the reference surface Ref, it is also possible to simultaneously perform double spiral recording using both of the two systems of the laser light for a recording layer. In this case, the recording signal generated by the recording processing unit 31 is respectively given to the light-emitting drive units 32 and 33. The light-emitting drive units 32 and 33 generate the laser driving signal Dr based on the recording signal and the lasers 11-1 and 11-2 for a recording layer based on the driving signal Dr are driven to emit light. According to this, it is possible to record the mark rows corresponding to the recording data to the recording layer 3.

The signal generation circuit 34 for a recording layer generates a RF signal (reproduction signal), a focus error signal FE-r and a tracking error signal TE-r, based on the light sensing signal DT-r (output current) from a plurality of light sensing elements as the light sensing unit 23 for a recording layer illustrated above in FIG. 4.

The focus error signal FE-r is a signal representing a focus error of the laser light for a recording layer to the recording layer 3 which is set to be a recording and reproduction target. In addition, the tracking error signal TE-r is a signal representing a positional error of the spot position of the laser light for a recording layer in a radial direction to the track formed on the recording layer 3.

The RF signal obtained by the signal generation circuit 34 for a recording layer is supplied to the reproduction processing unit 35 and the focus error signal FE-r and the tracking error signal TE-r are respectively supplied to the servo circuit 36 for a recording layer.

The reproduction processing unit 35 performs a binarization process, an encoding process of the recording modulation code and a predetermined decoding process such as an error correction process to the RF signal, thereby obtaining reproduction data in which the above-described recording data is restored.

In addition, the reproduction processing unit 35 also performs a reproduction process of a recording layer address inserted in the recording data. The recording layer address reproduced by the reproduction processing unit 35 is supplied to the controller 44.

The servo circuit 36 for a recording layer performs a servo operation process to the focus error signal FE-r and the tracking error signal TE-r and thus generates a focus servo signal FS-r and a tracking servo signal TS-r.

The tracking servo signal TS-r is supplied to a switch SW described later.

The focus servo signal FS-r is supplied to the focus driver 40. The focus driver 40 generates a focus drive signal FD-r based on the focus servo signal FS-r and thus drives the lens driving unit 16 based on the focus drive signal FD-r.

According to this, the focus servo control to the laser light for a recoding layer, that is, the focus servo control in which the laser light for a recording layer is condensed on the recording layer 3 as a recording target is realized.

The servo circuit 36 for a recording layer also controls the slide movement of the optical pickup OP which is performed by a slide driving unit 42.

The slide driving unit 42 holds the entire optical pickup OP to be slidably driven in a tracking direction.

The servo circuit 36 for a recording layer extracts a low frequency component of the tracking error signal TE-r to generate a slide error signal and thus generates a slide servo signal based on the slide error signal. The slide servo signal is given to a slide driver 43 so as to drive the slide driving unit 42, thereby realizing the slide servo control of the optical pickup OP. In addition, by giving a control signal in response to an instruction from the controller 44 to the slide driver 43, the servo circuit 36 for a recording layer realizes a desired slide movement of the optical pickup OP which is performed by the slide driving unit 42.

Moreover, the servo circuit 36 for a recording layer also performs an execution control of a track jump operation for causing the spot of the laser light for a recording layer to jump to another track by turning off the tracking servo, in response to the instruction from the controller 44.

The recording and reproduction apparatus 10 includes a signal generation circuit 37 for a reference surface, an address detection unit 38 and a servo circuit 39 for a reference surface, as a signal processing system with respect to the reflective light of the laser light for a reference surface.

The signal generation circuit 37 for a reference surface generates a necessary signal based on the light sensing signal DT-sv from the plurality of light sensing elements in the light sensing unit 29 for a reference surface shown in FIG. 4.

Specifically, the signal generation circuit 37 for a reference surface generates a tracking error signal TE-sv representing a positional error of the spot position of the laser light for a reference surface in a radial direction to the position guiding element (pit row) formed on the reference surface Ref, based on the light sensing signal DT-sv.

In addition, the signal generation circuit 37 for a reference surface generates a focus error signal FE-sv representing a focus error of the laser light for a reference surface to the reference surface Ref (reflection film 7).

Moreover, the signal generation circuit 37 for a reference surface generates a signal Dad for detecting an address as a signal for detecting address information recorded on the reference surface Ref. When the pit row is formed on the reference surface Ref, the signal generation circuit 37 for a reference surface may generate a sum signal as the signal Dad for detecting an address.

The signal Dad for detecting an address generated by the signal generation circuit 37 for a reference surface is supplied to the address detection unit 38. The address detection unit 38 detects a reference surface address ADR recorded on the reference surface Ref, based on the signal Dad for detecting an address. The detected reference surface address ADR is supplied to the controller 44.

The focus error signal FE-sv and the tracking error signal TE-sv generated by the signal generation circuit 37 for a reference surface are supplied to the servo circuit 39 for a reference surface.

The servo circuit 39 for a reference surface performs a servo operation process to the focus error signal FE-sv and the tracking error signal TE-sv and thus generates a focus servo signal FS-sv and a tracking servo signal TS-sv.

The focus servo signal FS-sv is supplied to the biaxial driver 41. The biaxial driver 41 generates a focus drive signal FD-sv based on the focus servo signal FS-sv and thus drives the focus coil of the biaxial actuator 21 based on the focus drive signal FD-sv.

According to this, the focus servo control to the laser light for a reference surface, that is, the focus servo control in which the laser light for a reference surface is condensed on the reference surface Ref is realized.

The servo circuit 39 for a reference surface also controls the slide movement of the optical pickup OP which is performed by a slide driving unit 42.

Specifically, the servo circuit 39 for a reference surface extracts a low frequency component of the tracking error signal TE-sv to generate a slide error signal and thus generates a slide servo signal based on the slide error signal. The slide servo signal is given to the slide driver 43 so as to drive the slide driving unit 42, thereby realizing the slide servo control of the optical pickup OP. In addition, by giving a control signal in response to an instruction from the controller 44 to the slide driver 43, the servo circuit 39 for a reference surface realizes a desired slide movement of the optical pickup OP which is performed by the slide driving unit 42.

Moreover, the servo circuit 39 for a reference surface also performs an execution control of a track jump operation for causing the spot of the laser light for a reference surface to jump to another track by turning off the tracking servo, in response to the instruction from the controller 44.

The tracking servo signal TS-sv generated by the servo circuit 39 for a reference surface is supplied to a t2 terminal of the switch SW.

The tracking servo signals TS-r and TS-sv are supplied to a computing unit 46 and a tracking servo signal TS-ats for the ATS servo is generated by a predetermined arithmetic process. The tracking servo signal TS-ats is supplied to a t3 terminal of the switch SW.

Herein, the switch SW is provided for the purpose of switching the tracking servo control of the objective lens 20 to the tracking servo control for causing the laser light for a reference surface to follow the position guiding element on the reference surface Ref, the tracking servo control for causing the laser light for a recording layer to follow the track on the recording layer 3, and the ATS control during recording.

For example, during reproduction, it is possible to perform the tracking servo control for causing the laser light for a recording layer to follow the track on the recording layer 3.

During recording, the ATS control in which the recording is performed while tracking to the adjacent track is performed.

During access (seeking) for reproduction or recording, the tracking servo control for causing the laser light for a reference surface to follow the position guiding element on the reference surface Ref is performed.

The switch SW selectively outputs any of the tracking servo signals TS-r, TS-sv, and TS-ats, in response to the instruction from the controller 44.

The tracking servo signal TS selectively outputted by the switch SW is supplied to the biaxial driver 41. The biaxial driver 41 drives the tracking coil of the biaxial actuator 21 by a tracking drive signal TD generated on the basis of the supplied tracking servo signal TS.

According to this, the objective lens 20 is driven so as to cause the spot of the laser light for a reference surface to follow the track on the reference surface Ref or to cause the spot of the laser light for a recoding layer to follow the track on the recording layer 3.

The controller 44 is configured to have, for example, a microcomputer including a memory (storage unit) such as a CPU (Central Processing Unit), a ROM (Read Only Memory), and a RAM (Random Access Memory). For example, by executing controlling and processing in accordance with a program stored in the ROM or the like, the entire control of the recording and reproduction apparatus 10 is performed.

For example, the controller 44 gives an instruction to the servo circuit 36 for a recording layer and the servo circuit 39 for a reference surface based on the recording layer address obtained by the reproduction processing unit 35 and the reference surface address ADR obtained by the address detection unit 38 and thus performs a seek operation control for causing the spot positions of the laser light for a reference surface and the laser light for a recording layer to move to a predetermined address.

In addition, by giving an instruction to the servo circuit 36 for a recording layer, the servo circuit 39 for a reference surface and the switch SW, the controller 44 realizes the focus servo control and the tracking servo control using methods corresponding to each case of the recording and reproduction to the multi-layer recording medium 1, the seeking using the reference surface Ref, or the like.

The controller 44 performs the reproduction operation, the recording operation, the access (seek) operation which are described above and the servo execution control for the reproduction operation, the recording operation and the access (seek) operation in response to a recording command and a reproduction command from a host device (not illustrated).

In addition to instructions from the host device, the reproduction operation, the recording operation, the access (seek) operation and the servo execution control for the reproduction operation, the recording operation and the access (seek) operation are performed, for example, in response to reading or updating the management information in the multi-layer recording medium 1, as necessary.

Moreover, in the embodiment, the controller 44 sets n consecutive layers to be the recording target layer in the recording operation including a test writing (OPC operation) for laser power adjustment and causes the recording unit (the recording unit includes a recording signal processing system such as the recording processing unit 31, a servo processing system during the recording operation, the optical pickup OP, and a servo driving system) to execute the recording operation to the n recording target layers. The details thereof will be described later.

A memory 47 is represented as a work area of the controller 44 or a RAM area in which various items of information are stored.

For example, the memory 47 is used for storing communication data with the host device, storing the laser power as the OPC result of each layer, and storing the management information read from the multi-layer recording medium 1, the management information to be updated corresponding to the recording operation or the like.

4. OPC Area Structure

The multi-layer recording medium 1 according to the embodiment is a recording medium in which the recording is performed to n consecutive layers (here, n≥2) as the recording target layer in the recording operation including the test writing for laser power adjustment, as an operation of the recording and reproduction apparatus 10 based on a process of the controller 44 described later. The multi-layer recording medium 1 has (n+1) or more layers and a test writing area (OPC area) is provided in each layer. The test writing area of each layer is formed between at least n consecutive layers and at a position in which the test writing areas are not overlapped with each other when seen from the laser light incident surface side.

Herein, the OPC area of the multi-layer recording medium 1 will be described.

First, the OPC operation using the ATS servo will be described in FIGS. 6A and 6B.

Figure 6A:
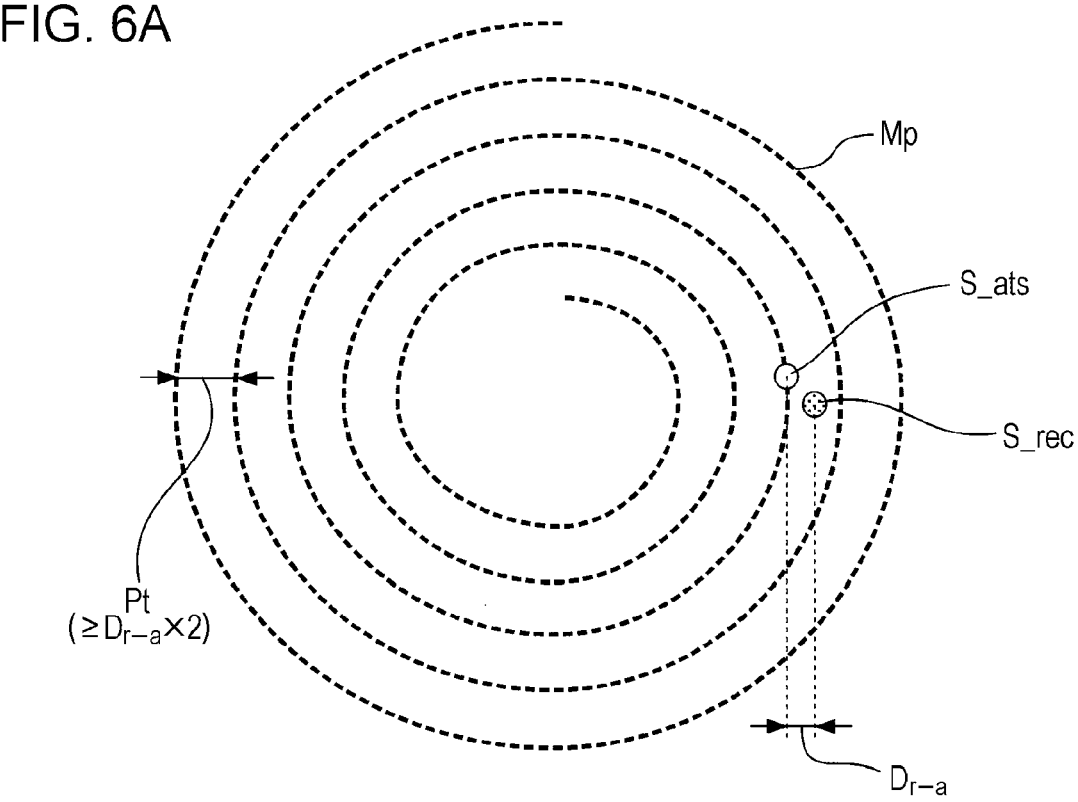
FIGS. 6A and 6B are views illustrating a track in an OPC area according to the embodiment.

In the OPC area of the multi-layer recording medium 1, as schematically shown in FIG. 6A, a pre-format mark row Mp is recorded. The pre-format mark row Mp is formed, for example, at a stage before shipping in a disc manufacturing facility.

The OPC operation may be executed while the ATS (Adjacent Track Servo) using the pre-format mark row Mp is performed.

FIG. 6A shows an ATS spot S_ats that is an illumination spot of one laser light for a recording layer in which the illumination thereof is carried out in order to perform the ATS and a spot S_rec for recording that is an illumination spot of the other laser light for a recording layer for recording information.

In the ATS, for example, in a state where the spot S_rec for recording is set to be a preceding spot and the ATS spot S_ats is set to be a following spot, the tracking servo is performed such that the ATS spot S_ats makes a tracing on the mark row.

In addition, as a recording and reproduction direction in which the recording and reproduction apparatus 10 performs the recording and reproduction to the multi-layer recording medium 1, a case where the recording and reproduction direction proceeds from the inner circumference side of the disc to the outer circumference side thereof or a case where the recording and reproduction direction proceeds from the outer circumference side of the disc to the inner circumference side thereof is exemplified. In FIGS. 6A and 6B, since the case where the recording direction proceeds from the inner circumference to the outer circumference is exemplified, the spot S_rec for recording as a preceding spot is positioned at the outer circumference and the ATS spot S_ats as a following spot is positioned at the inner circumference. The reverse is true of the case where the recording direction proceeds from the outer circumference to the inner circumference.

Herein, in a state where a separation distance (distance between center points) between the spot S_rec for recording and the ATS spot S_ats in the radial direction is set to be a distance $D_{r-a}$ between spots, as shown in the drawing, the pre-format mark row Mp in this case is formed in such a manner that the pitch Pt thereof (formation pitch in the radial direction) is more than twice as long as the distance $D_{r-a}$ between spots.

When the pre-format mark row Mp is formed by the pitch Pt which is more than twice as long as the distance $D_{r-a}$ between spots, the ATS is performed to cause the ATS spot S_ats to make a tracing on the pre-format mark row Mp as shown in the drawing. According to this, it is possible to perform the recording between the pre-format mark rows Mp by the spot S_rec for recording. That is to say, it is possible to perform the OPC test writing between the pre-format mark rows Mp.

Since the OPC test writing may be performed between the pre-format mark rows Mp, it is possible to perform reading (evaluating) the test written signal using the spot S_rec for recording (reproduction power) by performing the adjacent track servo (that is, tracking servo for causing the ATS spot S_ats to make a tracing on the pre-format mark row Mp) in a similar way during the test writing.

This means that there is no necessity that the tracking servo has to be performed to the test written mark row as a target, unlike the related art. As a result, it is possible to effectively prevent cases of the related art, such as a case where it is not possible to properly perform the test writing at the second and subsequent cycles after starting the test writing or a case where it is not possible to properly perform the evaluation of the test written signal, from occurring and thus to properly perform the OPC.

For confirmation, the reason why the pitch Pt is more than twice as long as the distance $D_{r-a}$ between spots is that, when performing the test writing between the pre-format mark rows Mp, a gap between the mark row formed by the test writing and a pre-recording mark row Mp for guiding is set not to exceed an optical limitation.

However, as the value of the pitch Pt is greater, the recording density tends to deteriorate. That is to say, in this sense, it is preferable that the pitch Pt be set to be a minimum value in a range where the condition in which the pitch Pt is more than twice as long as the distance $D_{r-a}$ between spots is satisfied. In other words, from the viewpoint of suppressing the deterioration of the recording density, it is most preferable that the pitch Pt be set to be twice as long as the distance $D_{r-a}$ between spots.

The specific method of the OPC will be described in FIG. 6B.

When performing the OPC test writing, the tracking servo is performed by the ATS such that the ATS spot S_ats makes a tracing on the pre-format mark row Mp.

In this state, referring to address information recorded on the pre-format mark row Mp, the test writing by the spot S_rec for recording (test writing for causing the power of the laser for recording to sequentially change) is started when the ATS spot S_ats reaches a predetermined test writing start position.

Figure 6B:
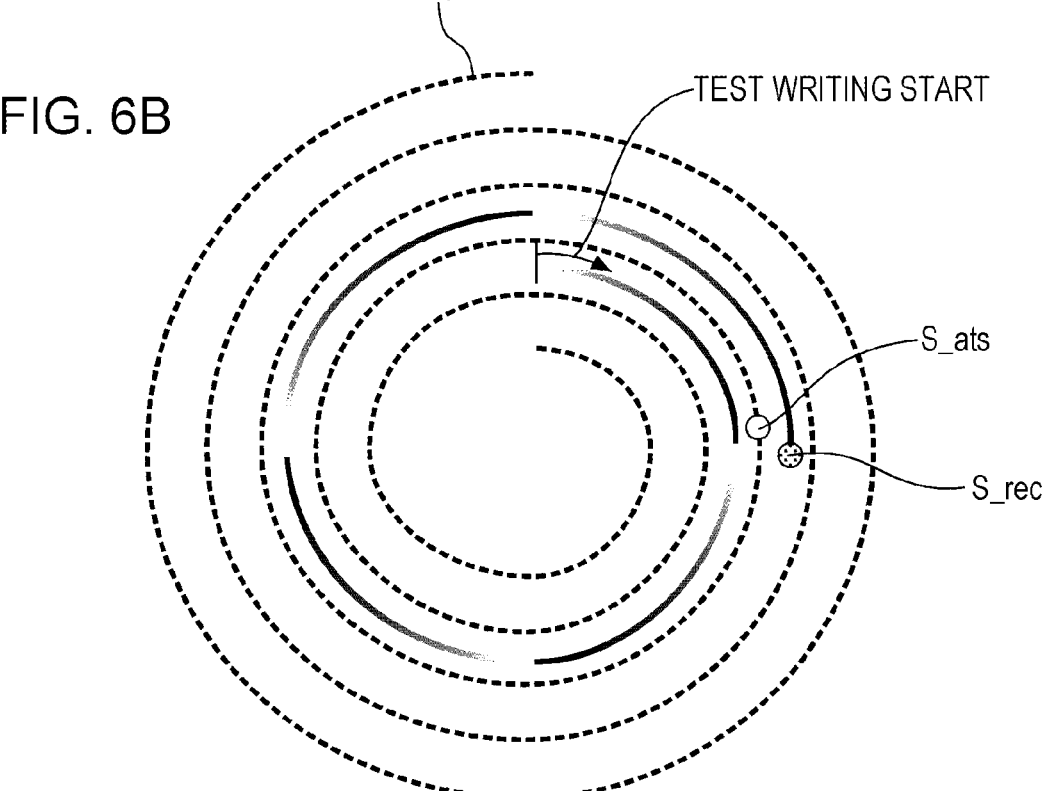

According to this, the test writing is performed between the pre-format mark rows Mp as shown in FIG. 6B. The laser power for recording is changed in a step-by step manner and, in FIG. 6B, this state is expressed as the grayscale of the tracks to be subjected to the test writing recording.

When the test writing is completed, the evaluation is performed to the signal recorded by the test writing. Specifically, similarly to the time of the test writing, the tracking servo is performed by the ATS such that the ATS spot S_ats makes a tracing on the pre-format mark row Mp. Then, the test written signal is read using the spot S_rec for recording (referred to as a reproduction power) and a predetermined evaluation value for evaluating signal quality such as a Jitter value is calculated, thereby performing the signal quality evaluation.

The optimum recording power is determined based on the result of the above-described signal quality evaluation and the power adjustment of the laser for recording is performed. According to this, the OPC is completed.

In the multi-layer recording medium 1 according to the embodiment, the OPC area of each layer is formed at least n consecutive layers and at a position in which the OPC areas are not overlapped with each other when seen from the laser light incident surface side. Details thereof will be described.

"n" is the number of layers as the recording target layer in the operation of the recording and reproduction apparatus 10 during recording described later (n≥2). For example, it is assumed that n=3. Then, the layer number in the multi-layer recording medium 1 is set to be "6" as shown in FIG. 1. That is, it is assumed that layers L0 to L5 are formed.

FIG. 7A schematically shows the arrangement of the OPC areas in the layers L0 to L5. In FIG. 7A, the lower side in the drawing is set to be the laser light incident surface side and the upper side in the drawing is set to be the depth side, that is, the layer L0 side and a disc radial position range in which the OPC areas are arranged is shown.

For example, as shown in FIGS. 6A and 6B, the OPC area is formed at a portion of the area in which the pre-format mark row Mp is formed and the OPC operation is performed by the ATS.

Practically, it is assumed that, in the pre-format mark row Mp, various items of management information such as physical information of the optical disc are recorded by the mark row, and a portion thereof is set to be the OPC area. The pre-format mark row Mp is formed at a position of the inner or outer circumference side of the multi-layer recording medium 1.

The OPC areas provided in the formation area of the pre-format mark row Mp are arranged as shown in FIG. 7A when seen from a disc cross-sectional direction.

For example, as shown in the drawing, the OPC areas of the layers L0 and L3 are arranged at a position in which the OPC areas are overlapped with each other when seen from the laser light axial direction. The OPC areas of the layers L1 and L4 are also arranged at a position in which the OPC areas are overlapped with each other when seen from the laser light axial direction. Moreover, the OPC areas of the layers L2 and L5 are also arranged at a position in which the OPC areas are overlapped with each other when seen from the laser light axial direction.

However, when considering the n (three) consecutive layers, the OPC areas are formed at a position in which the OPC areas are not overlapped with each other when seen from the laser light incident surface side.

As described later, the recording and reproduction apparatus 10 performs the recording operation to the three consecutive layers as the recording target layer. FIGS. 7A and 7B show the three consecutive layers as recording target layers RS0, RS1, RS2, and RS3.

For example, when checking a set of the three consecutive layers L0, L1, and L2 as the recording target layer RS0, the OPC areas are displaced in the disc radial direction not to be overlapped with each other when seen from the laser light incident surface side.

In addition, when also checking a set of the three consecutive layers L1, L2, and L3 as the recording target layer RS1, the OPC areas are displaced in the disc radial direction not to be overlapped with each other when seen from the laser light incident surface side.

Moreover, when also checking a set of the layers L2, L3, and L4 as the recording target layer RS2 or a set of layers L3, L4, and L5 as the recording target layer RS3, the OPC areas are displaced in the disc radial direction not to be overlapped with each other when seen from the laser light incident surface side.

Further, a hatched portion is a buffer area for reliably preventing the OPC areas in the three sets from being overlapped with each other.

As described above, the multi-layer recording medium 1 is set in such a manner that the OPC areas in the three consecutive layers are not overlapped with the OPC area of other layers.

Moreover, information on positions of the OPC areas in the respective layers L0 to L5 (for example, a start physical address or an end physical address of the OPC area) may be recorded, for example, as the management information by the pre-format mark row Mp. In other words, the arrangement of the OPC areas as shown in FIG. 7A may be set as content of the management information recorded on the pre-format mark row Mp.

By reading the pre-format mark row Mp when a disc as the multi-layer recording medium 1 is loaded, the recording and reproduction apparatus 10 may recognize the arrangement of the OPC areas in the respective layers L0 to L5.

The meaning that the OPC areas of the n (three) consecutive layers are not overlapped with each other as shown in FIG. 7A will be described.

When the management information or the user data is recorded on a certain layer, it is necessary to perform the OPC before the recording thereof and then to optimize the recording laser power.

As the restriction of the OPC execution, if the OPC areas to be arranged on the respective layers are used, the area of the layer at the front side (laser light incident surface side) which is overlapped with the OPC area has to be in an unused state. The reason is that, when the area where any recording operation is performed is positioned at the front side and, during the OPC execution, the laser light passes through the already-recorded area of the layer positioned at the front side, it is not possible to accurately perform the OPC operation due to the effect of the transmissivity modulation of the area.

In consideration of this restriction, it is necessary to arrange the OPC areas in all layers not to be overlapped with each other.

For the purpose of reference, FIG. 7B shows an example in which all OPC areas are arranged in the six layers of the layers L0 to L5 to be displaced to each other.

However, in this case, many unrecordable and unnecessary areas are generated and thus the disc recording capacity as a whole is degraded.

On the other hand, in consideration of the capacity, it is preferable that OPC areas of all layers be arranged in an overlapping manner. However, in this case, because of the above-described restriction, it is necessary to perform the recording from the most deeply positioned layer L0 in order.

On a single layer, the recording of user data, the recording of a file system of the user data, the recording of disk management information, the recording of an alternate area or the like is performed, but the progress of each recording is not the same. Therefore, in a case where the recording has to be performed from the most deeply positioned layer L0 in order, an effective recording operation is frequently prevented.

To address this circumstance, in this example, the OPC areas to be arranged on the respective layers, are arranged to be overlapped with each other in a portion of layers. As an overlapping manner, layers distant from each other definitely n (three) layers are overlapped with each other.

According to this, as shown in FIG. 7A, even in any of combinations of consecutive layers, that is, (layers L0, L1, and L2), (layers L1, L2, and L3), (layers L2, L3, and L4) and (layers L3, L4, and L5), the OPC areas are arranged not to be overlapped with each other.

According to this, in the recording and reproduction apparatus 10, the recording is generally performed within the limitations of the n (three) consecutive layers. That is, the recording target layers are set to be n consecutive layers and then the recording operation control is performed.

Generally speaking an example of the recording management, for example, when the layer L2 is filled with the recorded data and thus the recording is wanted to be performed to the layer L3, the recording area of the layer L0 is closed and then the recording operation transitions to the layer L3. Similarly, at the initial stage of the recording to the layer L4, the recording area of the layer L1 is closed. As this operation is repeated, the recording is controlled such that the recording is typically performed within three layers. A specific example of the recording control will be described later.

In the above-described multi-layer recording medium 1 according to the embodiment, it is not necessary to displace the arrangement of the OPC areas of all layers in a similar way shown in FIG. 7B. Therefore, it is possible to reduce an unnecessary area, thereby being advantageous to the capacity thereof. As a result, it is possible to increase the recording area of the user data.

In addition, since it is possible to execute a recording operation having a high degree of freedom between n layers (for example, three layers), practically, there is little possibility that an inefficient recording operation occurs.

Moreover, since the number of the recording layers is limited to n (three), there is an advantage in reducing the number or time of jump between layers, which is performed by the recording and reproduction apparatus 10.

FIG. 8 shows an example of the (m+1)-layer structure, that is, the layer structure having layers L0 to Lm, as an example of the multi-layer recording medium 1.

When n=3, as shown in the drawing, the sets of the three consecutive layers are considered as recording target layers RS0 to RSm−2.

In this case, when checking any set of three layers of (layers L0, L1, and L2), (layers L1, L2, and L3), ..., (layers Lk−2, Lk−1, and Lk), ..., (layers Lm−2, Lm−1, and Lm), the OPC areas are arranged not to be overlapped when seen from the laser incident surface side. That is, it is possible to simultaneously perform the recording to the three layers of each set.

In this case, for example, the recording is performed on the set of the layers Lk−2, Lk−1, and Lk as the recording target layer RSk−2. When it is necessary to perform the recording to the layer Lk+1, the layer Lk−2 is closed at the time of recording to the layer Lk+1. By repeating this operation, it is possible to continuously perform the recording to the three layers in which the OPC areas are not overlapped with each other.

Figure 9:
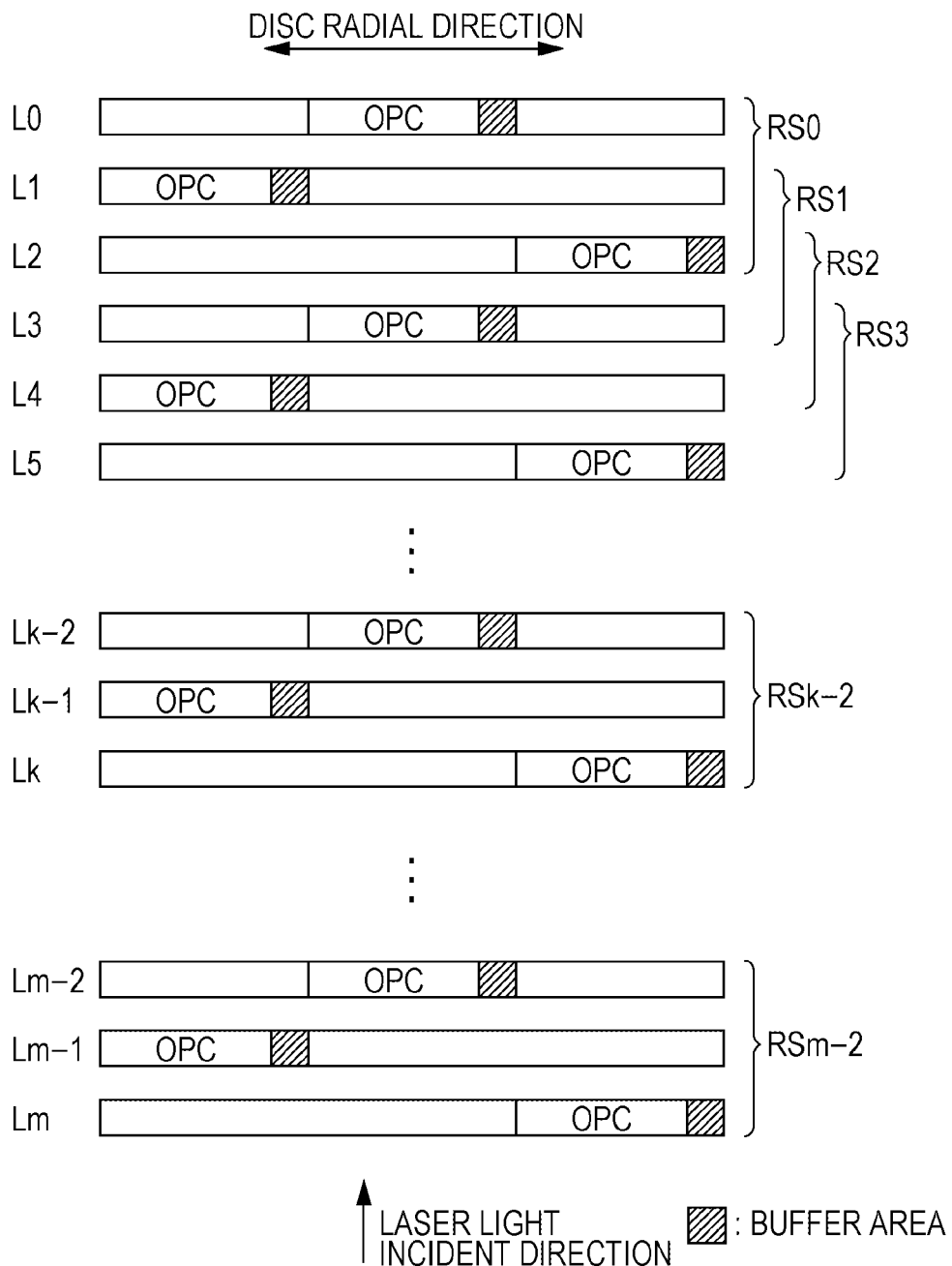
FIG. 9 is a view illustrating another example of the OPC area arrangement of a (m+1)-layer disc according to the embodiment.

Various methods of displacing the OPC areas may be considered. For example, the arrangement of each OPC area of the layers L0 to Lm may be displaces in the radial direction as shown in FIG. 9.

In all respects, when checking any of three (n) consecutive layers, the OPC areas may be arranged not to be overlapped with each other.

A case where n=3 is merely an example. The number n of the layers in which the simultaneous recording can be performed, as the recording target layer, may be four.

Figure 10:
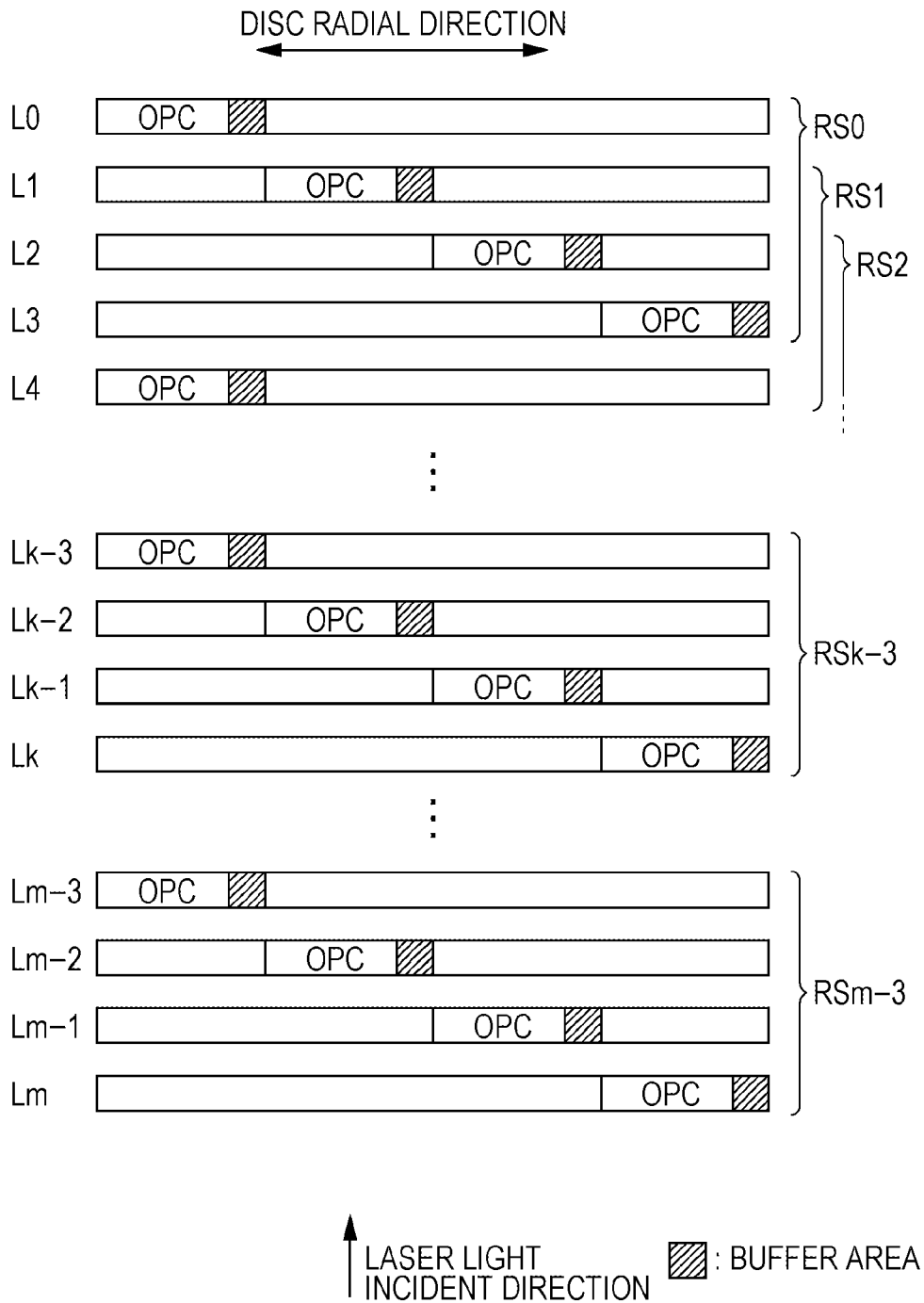
FIG. 10 is a view illustrating another example of the OPC area arrangement of a (m+1)-layer disc according to the embodiment.

FIG. 10 shows an arrangement example of the OPC areas when n=4.

When n=4, as shown in FIG. 10, the sets of the four consecutive layers are considered as recording target layers RS0 to RSm−3.

In this case, when checking any set of four layers of (layers L0, L1, L2, and L3), (layers L1, L2, L3, and L4), ..., (layers Lk−3, Lk−2, Lk−1, and Lk), ..., (layers Lm−3, Lm−2, Lm−1, and Lm), the OPC areas are arranged not to be overlapped when seen from the laser incident surface side. That is, it is possible to simultaneously perform the recording to the four layers of each set.

In this case, for example, the recording is performed on the set of the layers Lk−3, Lk−2, Lk−1, and Lk as the recording target layer RSk−3. When it is necessary to perform the recording to the layer Lk+1, the layer Lk−3 is closed at the time of recording to the layer Lk+1. By repeating this operation, it is possible to continuously perform the recording to the four layers in which the OPC areas are not overlapped with each other.

In the example of FIG. 10, the OPC areas are arranged to be overlapped with each other every four layers. However, if n=p, by arranging the OPC areas of (layers Lk-p, Lk-p+1, ..., Lk) not to be overlapped with each other, it is possible to simultaneously perform the recording to p consecutive layers. Similarly, in this case, the layer Lk-p is closed at the time of recording to the layer Lk+1. By repeating this operation, it is possible to continuously perform the recording to the p layers in which the OPC areas are not overlapped with each other.

5. First Example of Recording Process

An example of the recording process on the multi-layer recording medium 1 performed by the recording and reproduction apparatus 10 as described above will be described. Hereinafter, the description will be given of the example of the six-layer recording medium having the layers L0 to L5 as shown in FIG. 1. In addition, the number n of the recording target layers as described above is set to be three.

Figure 11:
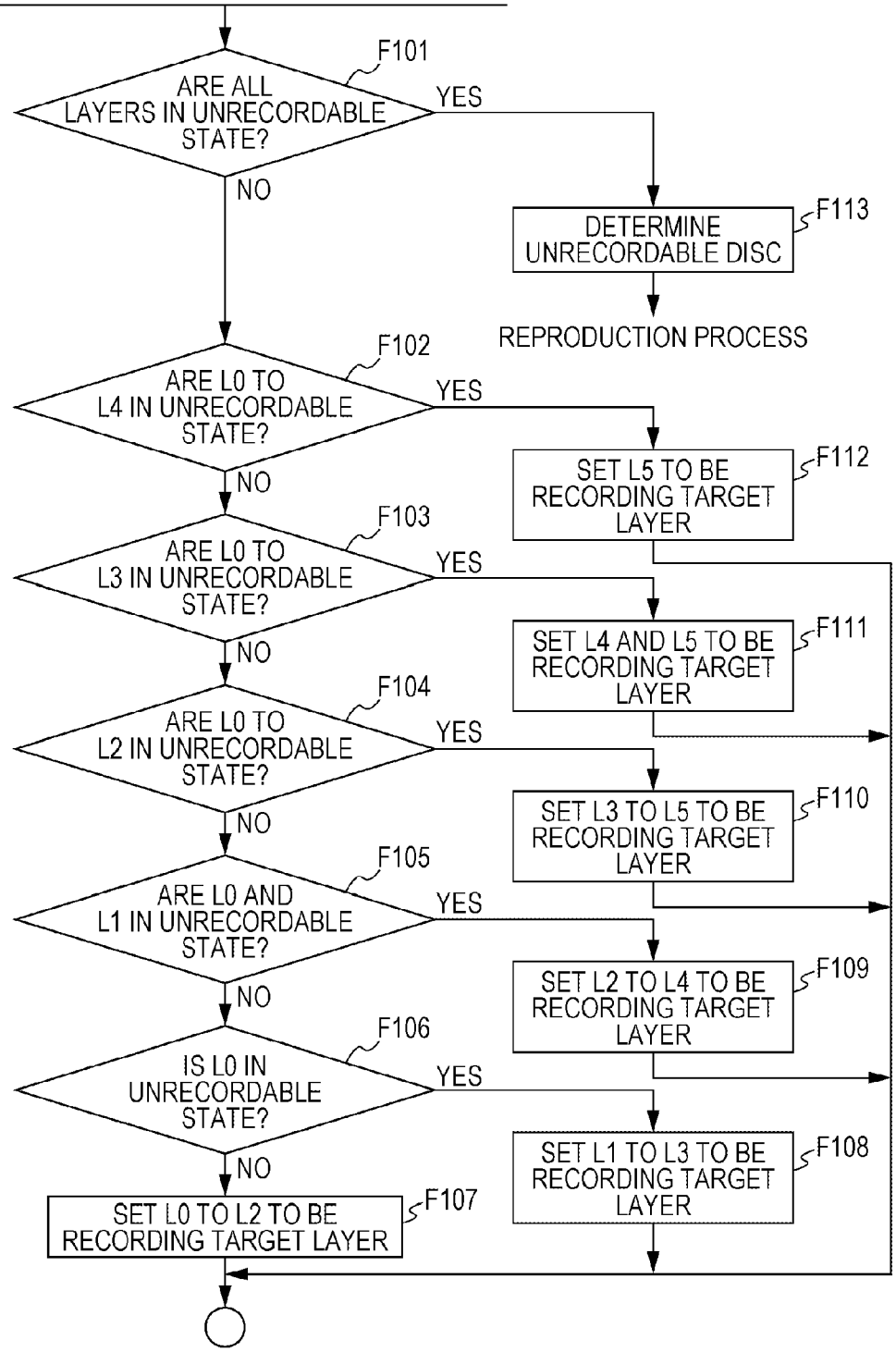
FIG. 11 is a flowchart of a recording target layer setting process according to the embodiment.

FIG. 11 shows an example of checking process of the controller 44 when the multi-layer recording medium 1 is loaded. In this example, the controller 44 of the recording and reproduction apparatus 10 checks the status of each layer with respect to the loaded multi-layer recording medium 1 and sets the recording target layer.

In addition, although details thereof is omitted, in the multi-layer recording medium 1, a management area for recording management information is provided and a TDMA (Temporary Disc Management Area) for recording track information of the data recording, alternation process information or the like is provided as the management area. In this TDMA, information representing the current status of a track to be subjected to sequential recording (SRR: Sequential recording range), alternation process information using a spare area (SPA) or the like is sequentially recorded.

By reading the information recorded in the TDMA, the recording and reproduction apparatus 10 may recognize the current status of the loaded multi-layer recording medium 1.

When the multi-layer recording medium 1 is loaded and various items of management information including TDMA information are read, the controller 44 of the recording and reproduction apparatus 10 performs the setting of the recording target layer to the multi-layer recording medium 1 by using a process of FIG. 11.

In this process, the controller 44 determines the recording status of each layer based on the information recorded in the TDMA, and, specifically, determines whether or not the subsequent recording is possible, depending on a closing process.

When it is detected that all layers are already in an unrecordable state in Step F101, the controller 44 does not perform the recording operation to currently-loaded multi-layer recording medium 1. Therefore, the controller 44 determines that the multi-layer recording medium 1 is an unrecordable disc in Step F113. Thereafter, the process waits for receiving an instruction for the reproduction process from the host device.

When it is detected that the layers L0 to L4 are in an unrecordable state, the process of the controller 44 proceeds from Step F102 to Step F112 and then the controller 44 sets only the layer L5 to be the recording target layer.

When it is detected that the layers L0 to L3 are in an unrecordable state, the process of the controller 44 proceeds from Step F103 to Step F111 and then the controller 44 sets the layers L4 and L5 to be the recording target layer.

When it is detected that the layers L0 to L2 are in an unrecordable state, the process of the controller 44 proceeds from Step F104 to Step F110 and then the controller 44 sets the layers L3, L4, and L5 to be the recording target layer.

When it is detected that the layers L0 and L1 are in an unrecordable state, the process of the controller 44 proceeds from Step F105 to Step F109 and then the controller 44 sets the layers L2, L3, and L4 to be the recording target layer.

When it is detected that the layers L0 is in an unrecordable state, the process of the controller 44 proceeds from Step F106 to Step F108 and then the controller 44 sets the layers L1, L2, and L3 to be the recording target layer.

When none of layers is in an unrecordable state, the process of the controller 44 proceeds to Step F107 and then the controller 44 sets the layers L0, L1, and L2 to be the recording target layer.

As described above, when the multi-layer recording medium 1 is loaded, the controller 44 sets the recording target layer in such a manner that layers are used in order from the layer at the depth side when seen from the laser light incident surface side.

Particularly, among the recordable layers, n (three) consecutive layers including the most deeply positioned layer when seen from the laser light incident surface side are set to be the recording target layer.

In addition, there are cases where the recording target layer is one as shown in Step F112 and the recording target layer is two as shown in Step F111. However, the number of the recording target layers is determined depending on the remaining recordable layers. When there are three or more recordable layers, three consecutive layers from the most deeply positioned layer of the recordable layers are set to be the recording target layer.

When the recording target layer is set as described above, the controller 44 executes and controls the recording operation, in which layers are used in order from the layer at the depth side, to the three recording target layers.

Figure 12:
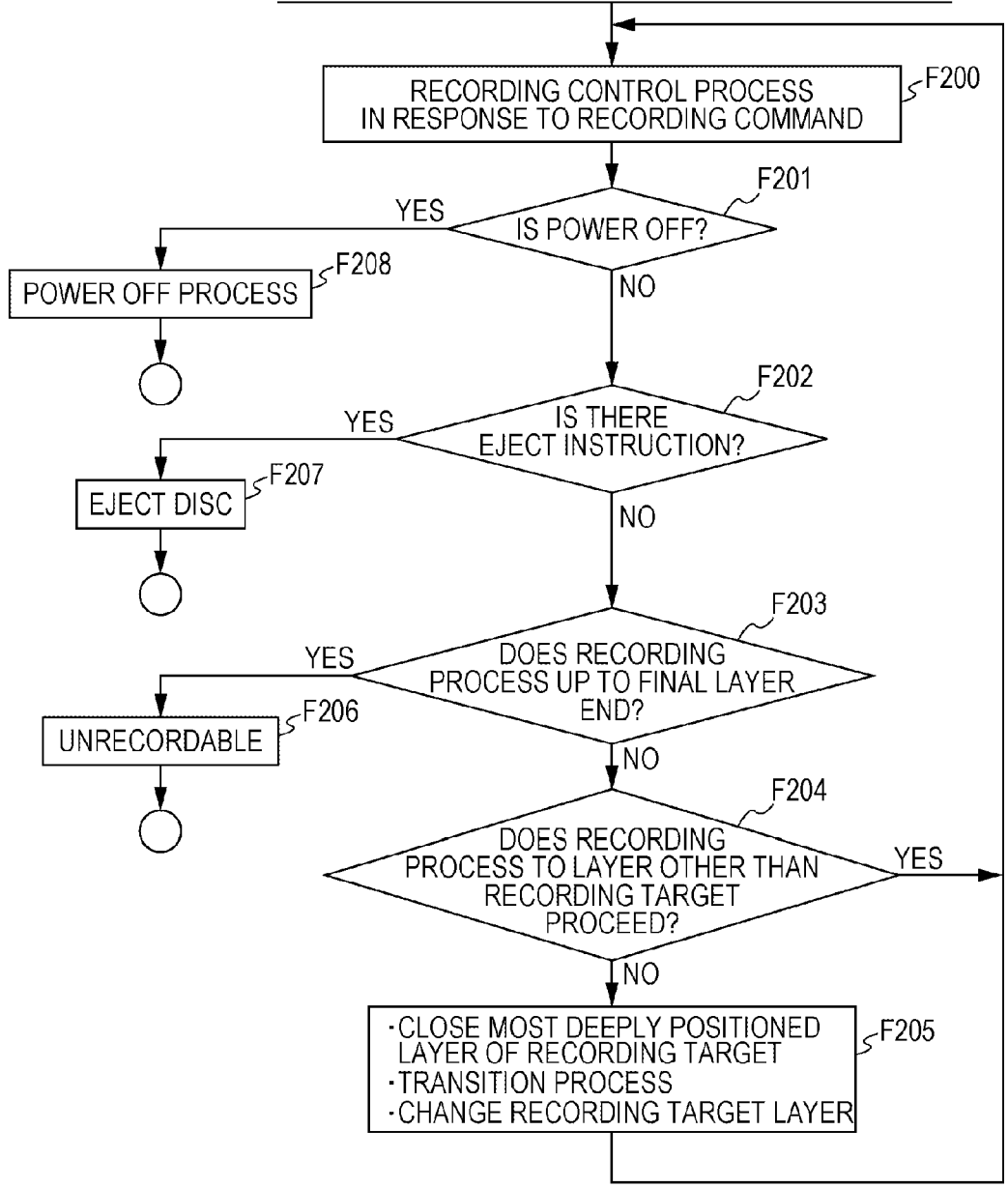
FIG. 12 is a flowchart of a first example of a recording process according to the embodiment.

FIG. 12 shows a recording control process of the controller 44 in response to the recording command from the host device.

The controller 44 executes a necessary recording control process in Step F200 in response to a recording command from the host device and controls each unit shown in FIG. 5 so as to execute the recording operation.

As the recording operation, specifically, signal processing of the recording data (user data or the like) supplied from the host device which is performed by the recording processing unit 31, laser driving performed by the light-emitting drive unit 33, writing on the multi-layer recording medium 1 which is performed by the optical pickup OP, and various servo operations for recording are executed. The controller 44 instructs each unit to execute the operation and thus a desired recording operation is executed.

In addition, the controller 44 performs a necessary control such that the information recording in the TDMA corresponding to user data or the like, data updating or an alternation process in response to a defect area is also performed.

As the recording control in Step F200, the controller 44 sets the recording target layers to be used from the most deeply positioned layer thereof.

FIGS. 13 to 17 show a configuration example of areas on the multi-layer recording medium 1.

In FIGS. 13 to 17, a case where a main data area is divided into three sequential recording tracks (SRR#1, SRR#2, and SRR#3) and then the respective layers L0 to L5 are operated in five areas of the SRR#1, the SRR#2, and the SRR#3, the management area, and the SPA (spare area) is exemplified.

In each drawing, a portion in which the recording has been performed is shown in a hatched portion.

If the layers L0 to L2 of the multi-layer recording medium 1 are set to be the recording target layer now, as shown in each drawing, the controller 44 controls the recording operation in each area such that the recording target layers are used from the most deeply positioned layer L0.

The desired recording operation is executed by the recording control in Step F200 of FIG. 12. While the process of Step F200 is performed at a desired time in response to a command or the like from the host device, the controller 44 executes processes in Steps F201 to F205, as necessary.

When an instruction for turning off power is detected, the process of the controller 44 proceeds from Step F201 to Step F208 and then performs a process of turning off power.

When an instruction for ejecting a disc is detected, the process of the controller 44 proceeds from Step F202 to Step F207 and then performs a process of ejecting a disc. That is, discharging the multi-layer recording medium 1 is executed by a disc discharging mechanism (not illustrated).

When it is detected that the recording areas are used up to the layer L5, which is the final layer, in Step F203, the controller 44 sets the subsequent layers to be unrecordable in Step F206 because it is not possible to perform the subsequent recording.

In Step F204, the controller 44 determines whether or not the recording operation executed by the control in Step F200 proceeds to a layer other than the recording target layer. When it determined that the recording operation does not proceed to a layer other than the recording target layer, the recording operation is continuously executed by the control in Step F200.

On the other hand, when the recording operation proceeds to a layer other than the recording target layer, for example, when the recording operation is wanted to proceed to the next layer beyond the recording target layer such as a case where layers are used up to the layer L2 by recording the user data and thus the recording operation is wanted to proceed to the layer L3 in a state where the layers L0 to L2 are set to be the recording target layer, the process of Step F205 is performed.

That is to say, the controller 44 closes the most deeply positioned layer (for example, in the above-described example, the layer L0) of the layers which are set to be the recording target layer at that time.

In addition, a transition process of an area in which the subsequent recording is performed is carried out. Then, the recording target layer is changed. That is, the recording target layers are changed from the layers L0 to L2 to the layers L1 to L3. By performing this process, the recording control in Step F200 continues.

With reference to FIGS. 13 to 17, the process of Step F205 will be described in detail.

As described above, FIGS. 13 to 17 show examples in which the layers L0 to L5 are operated in five areas of the SRR#1, the SRR#2, and the SRR#3, the management area, and the SPA.

The main data area is divided into three tracks of the SRR#1, the SRR#2, and the SRR#3 and, for example, it is assumed that the SRR#1 is used as an area in which the file system records metadata, the SRR#2 is used as an area for recording the actual user data, and the SRR#3 is used as a mirror area for recording the mirror of the metadata. In addition, herein, the metadata is file management information of the user data, and the user data and the metadata is data which the host device requests the recording and reproduction apparatus 10 to record.

The SPA (spare area) is an area which is used for the alternation of the defect area or rewriting as a so-called logical overwriting.

The management area is an area in which the management information is sequentially recorded as the TDMA.

In the examples of FIGS. 13 to 17, the configuration in which portions positioned at the same radial position on the disc are assigned to areas having the same roles, in the respective layers L0 to L5, is exemplified.

Moreover, each drawing also shows the OPC area which is provided in the pre-format mark row Mp formation area. For the OPC areas, as described in FIG. 7A, the OPC areas of the three consecutive layers are arranged not to be overlapped with each other.

FIGS. 13 to 17 show a case where, when the layers L0 to L2 are set to be the recording target layer, each area of layers is used up to the layer L2.

Figure 13:
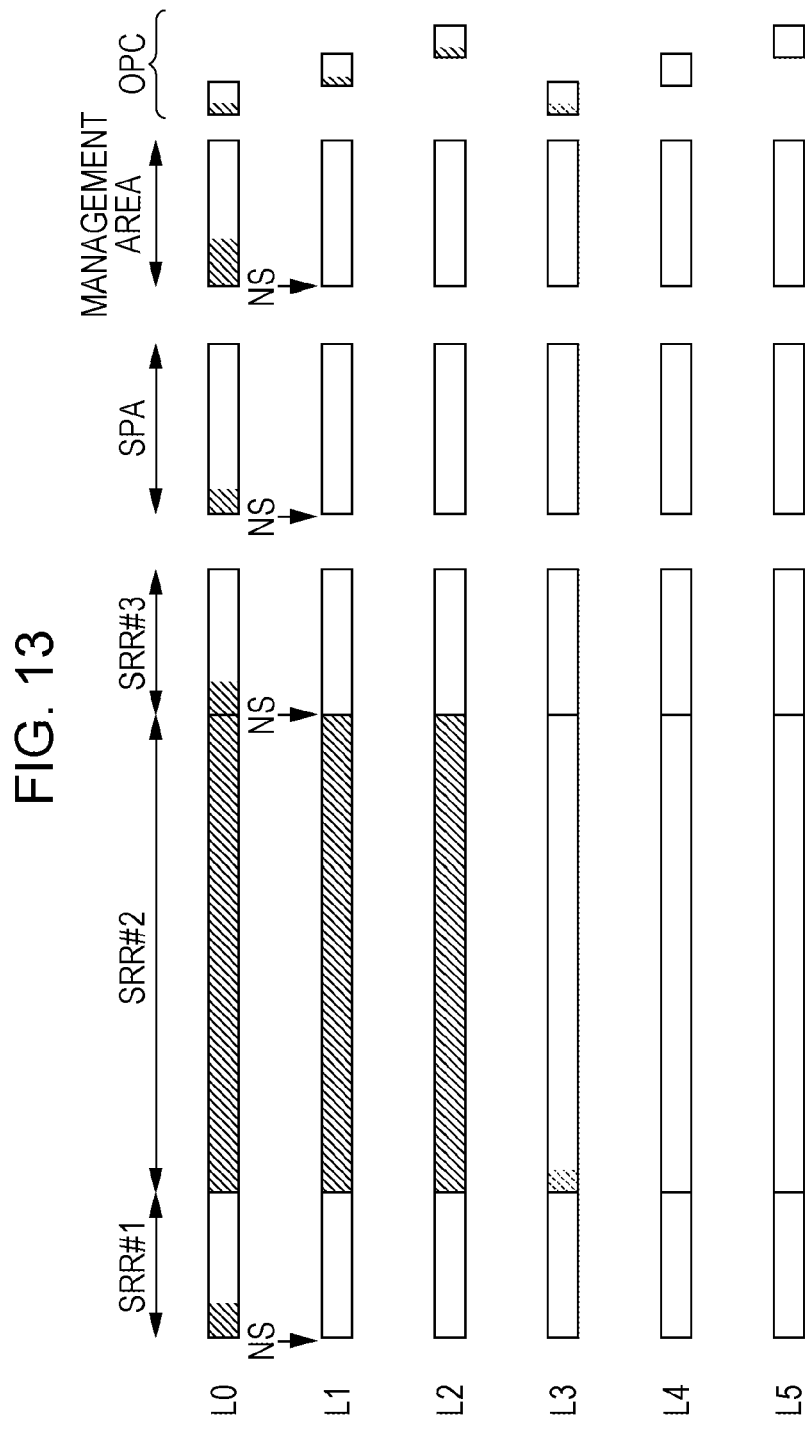
FIG. 13 is a view illustrating a case where a SRR#2 according to the embodiment is used beyond a recording target layer.

First, FIG. 13 shows a state where the user data recording to the SRR#2 proceeds beyond the recording target layer.

When the user data having a relatively large capacity, for example, streaming data of movies or the like is recorded, as shown in FIG. 13, the areas of the SRR#2 of the layers L0 to L2 are used up and thus there occurs a case where the subsequent user data recording is wanted to be performed to the SRR#2 of the layer L3.

Particularly, when appending a large size file continues, the number of appending operations decreases and then the management data to be recorded in the management area (TDMA) is also reduced. In addition, file system information to be recorded to the SRR#1 and the SRR#3 is also reduced. In this case, as shown in the drawing, only the recording operation of the SRR#2 proceeds greater than other areas.

However, in a case of the drawing, recordable areas are still remained in the SRR#1, SRR#3, SPA, and management area of the layer L0. Further, the test writing is still allowed to perform to the OPC area thereof. However, in the embodiment, the three consecutive layers are used as the recording target layer. Therefore, in this case, the recording target layer is changed to the layers L1 to L3 by performing the process of Step F205 in FIG. 12.

Specifically, the closing process is performed to the SRR#1, SRR#2, and SRR#3 of the layer L0 and thus the main data area of the layer L0 is set to be unusable afterward.

In addition, as the transition process, an area in which the metadata is subsequently recorded is set to be the SRR#1 and SRR#3 of the layer L1. Further, the SPA of the layer L0 is not used afterward and a SPA to be subsequently used is set to be the SPA of the layer L1. Furthermore, for the management area, the management area of the layer L0 is not used afterward and an area in which the management information is subsequently appended is set to be the management area of the layer L1.

For example, this transition information is recorded as the latest information which is recorded in the management area (TDMA) of the layer L0. In the drawing, the transition process of each area is expressed as next recording start points NS.

In a state where the layer L0 is set to be unrecordable by performing the process of Step F205 as described above, the controller 44 changes the recording target layer to the layers L1 to L3 and performs the information update of the TDMA for SRR closing or the transition process so as to continue the recording process. That is to say, the controller 44 enables the recording of the user data using the SRR#2 of the layer L3 (recording operation represented by a portion of the layer L3 that is hatched with broken lines) to be executed.

As described above, for the OPC operation, it is necessary to set the area of the layer in front of the OPC area, which is executed, to be in an unused state. In the multi-layer recording medium 1 of this example, the OPC areas of the layers L0 and L3 are overlapped with each other. When the recording to the layer L3 is performed, it is necessary to perform the OPC operation in the OPC area of the layer L3 before the recording to the layer L3.

That is, this means that, after the data recording operation including the OPC operation to the layer L3 is performed, it is not possible to perform the OPC operation to the OPC area of the layer L0.

In this case shown in FIG. 13, as the recording control, the controller 44 sets the layer L0 to be unrecordable afterward.

That is, the controller 44 does not allow the OPC operation to be performed to the layer L0 and then changes the recording target layer to the layers L1 to L3 so as to continue the recording. According to this, it is possible to continue the recording by allowing the layer to proceed to the front side thereof and not to execute an inappropriate recording operation to the layer L0 due to the inaccurate OPC operation afterward.

According to the above-described transition process, since, the SRR#1, the SRR#3, the SPA, and the management area are closed before all respective areas of the SRR#1, the SRR#3, the SPA, and the management area are used up and then an area of the next layer is to be used, it is considered that the number of which the appending can be performed decreases compared to a case where all areas can be effectively used. However, practically, in this case as shown in FIG. 13, since a large size user data file is recorded and thus the capacity of the main data area is largely reduced, the total number of which the appending is performed to the multilayer recording medium 1 decreases. Therefore, it is considered that there is no substantial effect.

Figure 14:
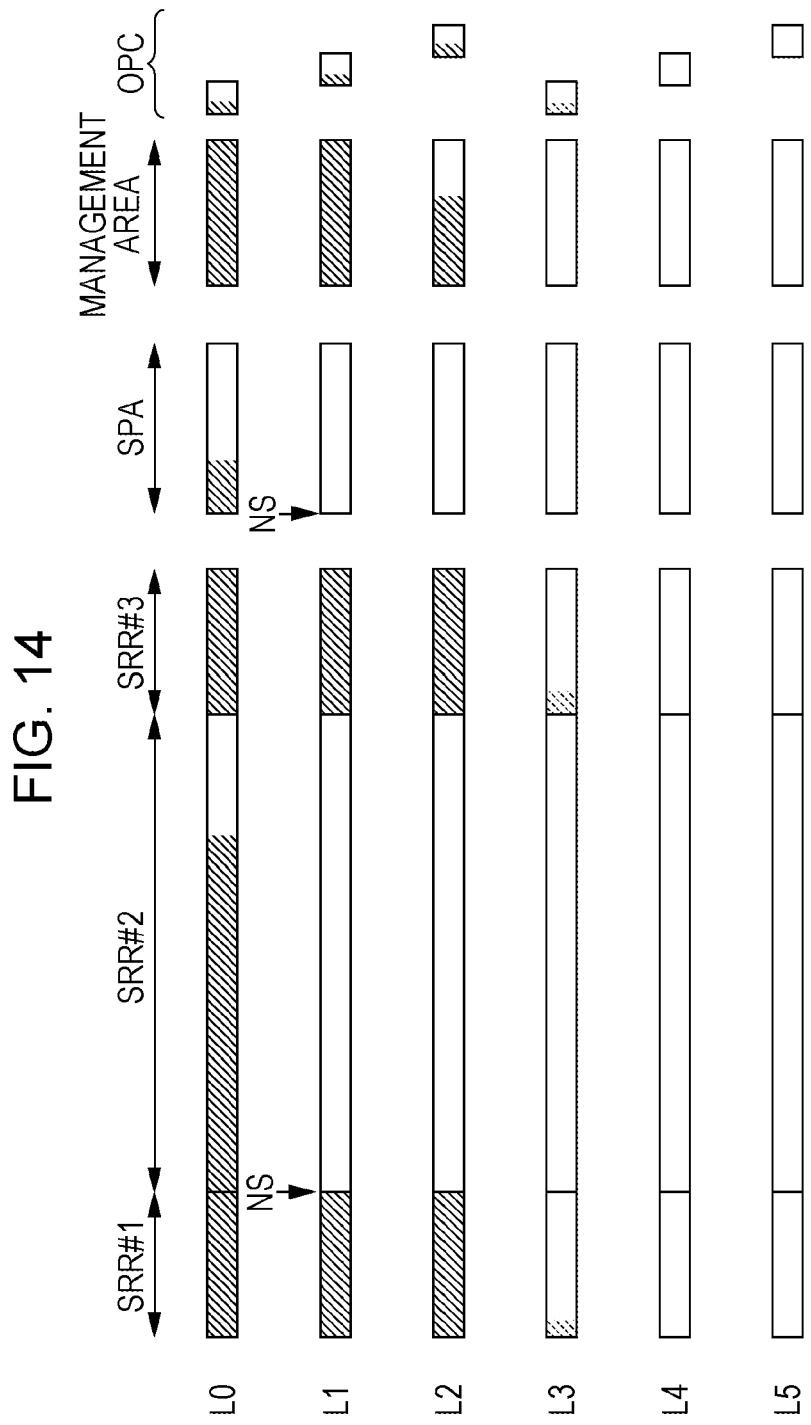
FIG. 14 is a view illustrating a case where a SRR#1 and a SRR#3 according to the embodiment are used beyond the recording target layer.

Next, FIG. 14 shows a case where the metadata recording to the SRR#1 and the SRR#3 proceeds more than other areas.

When a plurality of small size user data files are appended and the ejecting operation is performed per the appending operation, the consumption of areas of the SRR#1 and SRR#3 in which the metadata is recorded increases. In a case shown in FIG. 14, in order to subsequently record the metadata, it is necessary to use the layer L3.

Here, the controller 44 performs the process of Step F205. That is, in this case, recordable areas are still remained in the SRR#2, SPA, and management area of the layer L0. Further, the test writing is still allowed to perform to the OPC area thereof. However, by performing the closing process of the layer L0 and the transition process of each area as shown by the next recording start points NS, the recording target layer is changed to the layers L1 to L3.

According to this process, it is possible to record the metadata using the layer L3 (including the OPC in the layer L3) afterward.

In this case, for the SRR#2 in which the user data is recorded, the area of the layer L0 is closed and thus it is necessary for the recording to proceed to the layer subsequently positioned from the layer L1. Therefore, the recordable capacity of the user data decreases. However, practically, in consideration of a conceivable file size, by determining the sizes of the SRR#1 and the SRR#3, which are the metadata recording area, in accordance with the file size, reducing the frequency of the metadata recording or the like, it is possible to reduce the usage of the metadata recording area (SRR#1 and SRR#3). According to this, it is considered that it is possible to suppress the effect of the reduction in the user data capacity to the minimum.

Figure 15:
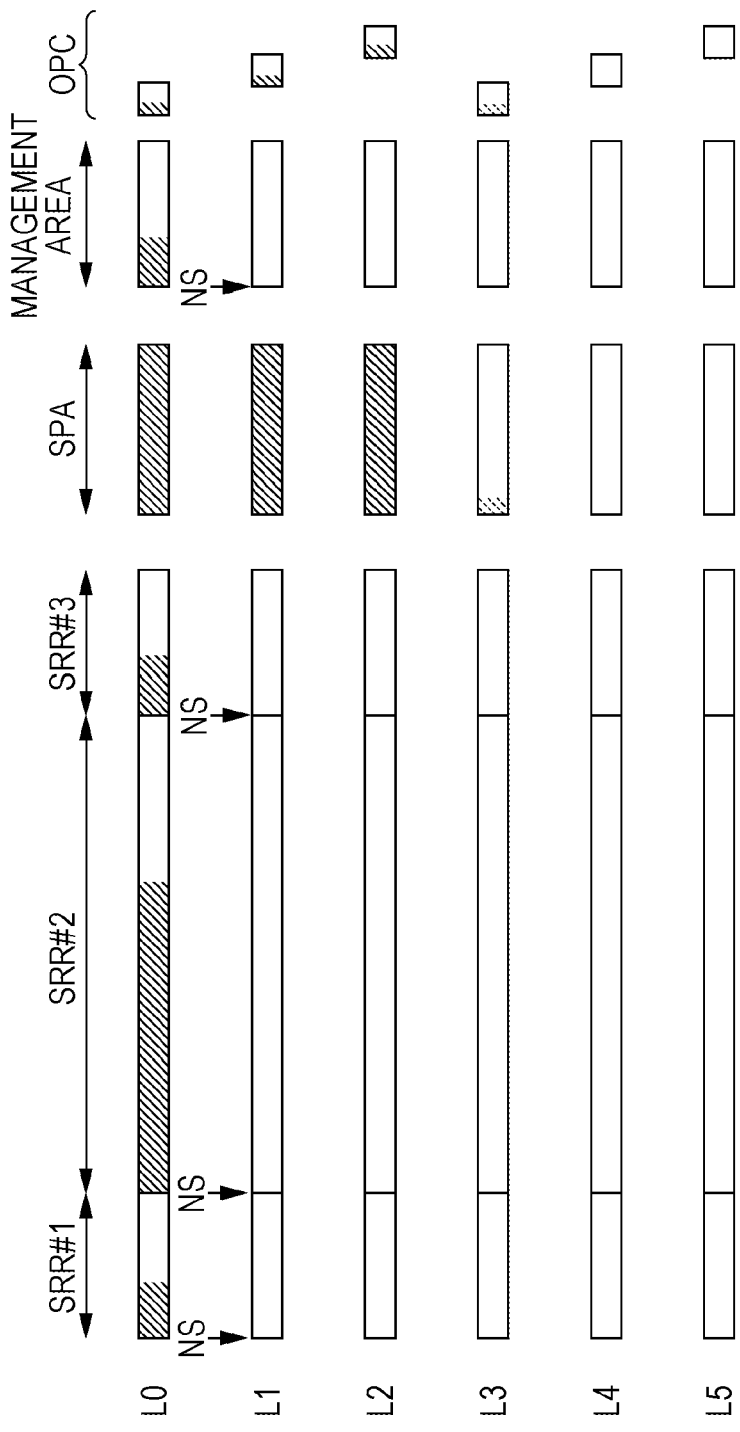
FIG. 15 is a view illustrating a case where a SPA according to the embodiment is used beyond the recording target layer.

Next, FIG. 15 shows a case where the use of the SPA proceeds more than other areas.

When a defect frequently occurs or a necessary capacity is not recorded in the SRR#2 because the recording track pitch is larger than expected, the usage of the SPA increases.

In similar to other areas, when the SPA of the layer L3 is wanted to be used even in a case where the other areas use the layer L0, it is necessary to proceed to the layer of the other areas.

Then, the controller 44 performs the process of Step F205. In this case, recordable areas are still remained in the SRR#1, SRR#2, SRR#3 and management area of the layer L0. Further, the test writing is still allowed to perform to the OPC area thereof. However, by performing the closing process of the layer L0 and the transition process of each area as shown by the next recording start points NS, the recording target layer is changed to the layers L1 to L3.

According to this process, it is possible to use the SPA of the layer L3 (including the OPC in the layer L3) afterward.

In this case, by closing the SRR#2 of the layer L0 in the middle thereof, the recordable capacity of the user data also decreases. However, since the control of the recording track pitch is predictable based on the performance of the recording apparatus, the SPA corresponding thereto may be prepared during formatting. In addition, for the defect, since the defect in manufacturing is managed during manufacturing, many defects are not predicted to be found. Since it is not possible to avoid the reduction in the capacity due to damages occurring after shipping, there is no necessity to consider this as a problem herein. Therefore, practically, it is possible that the case as shown in FIG. 15 rarely occurs.

Figure 16:
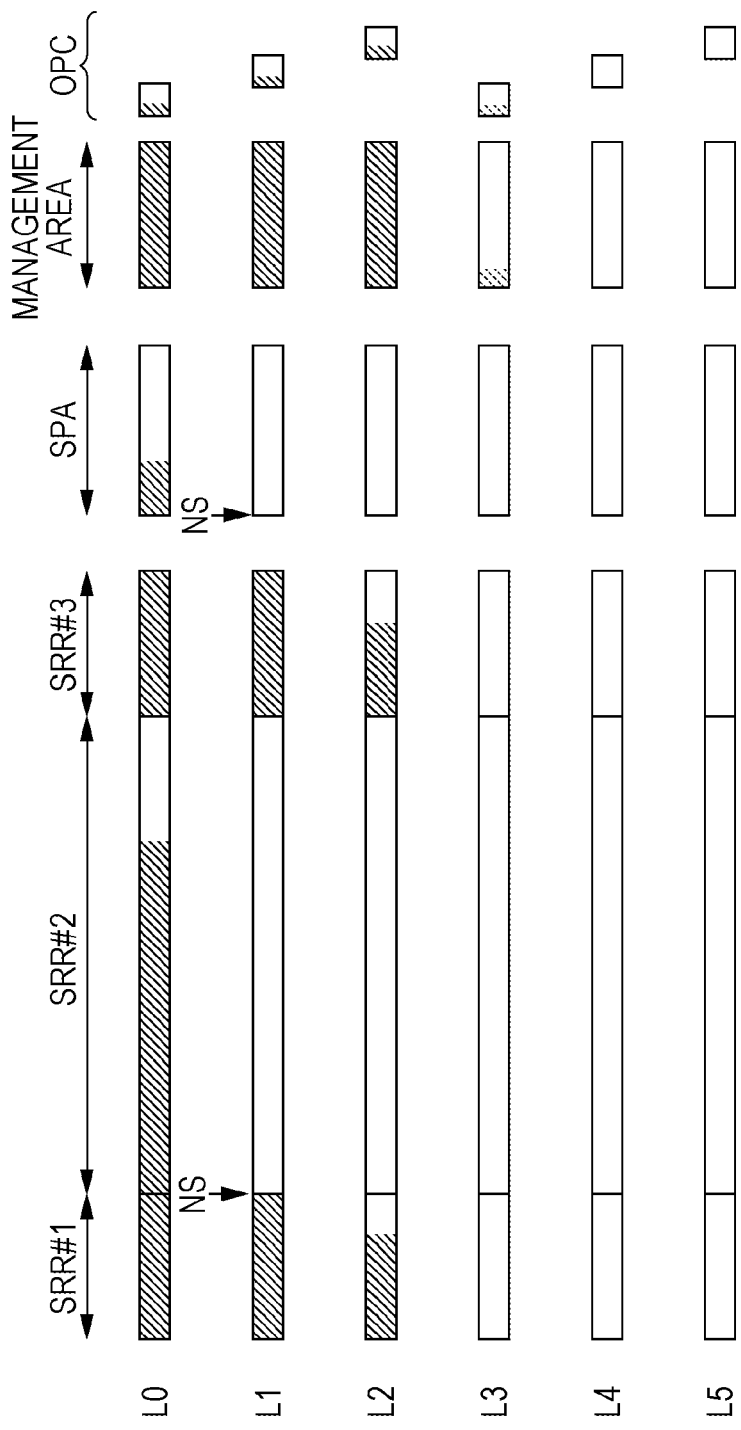
FIG. 16 is a view illustrating a case where a management area according to the embodiment is used beyond the recording target layer.

Next, FIG. 16 shows a case where the use of the management area (TDMA) proceeds more than other areas.

Since the occurrence frequency of the logical overwrite (data rewriting) or the like increases when a plurality of files having a small data size are appended, the consumption of the management area increases. Moreover, when the use of the management area transition to the layer L3, it is necessary to proceed to the layer of other areas even in a case where the other areas use the layer L0.

Then, the controller 44 performs the process of Step F205. In this case, recordable areas are still remained in the SRR#1, SRR#2, SRR#3 and SPA of the layer L0. Further, the test writing is still allowed to perform to the OPC area thereof. However, by performing the closing process of the layer L0 and the transition process of each area as shown by the next recording start points NS, the recording target layer is changed to the layers L1 to L3.

According to this process, it is possible to record the management data using the management area (TDMA) of the layer L3 (including the OPC in the layer L3) afterward.

In this case, by closing the SRR#2 of the layer L0 in the middle thereof, the recordable capacity of the user data also decreases. However, in consideration of a conceivable file size, by determining the size of the TDMA, in accordance with the file size or the like, it is possible to prevent a case where the consumption of the management area proceeds greater than other areas from occurring. Therefore, generally, it is considered that the case as shown in FIG. 16 can be avoided.

Figure 17:
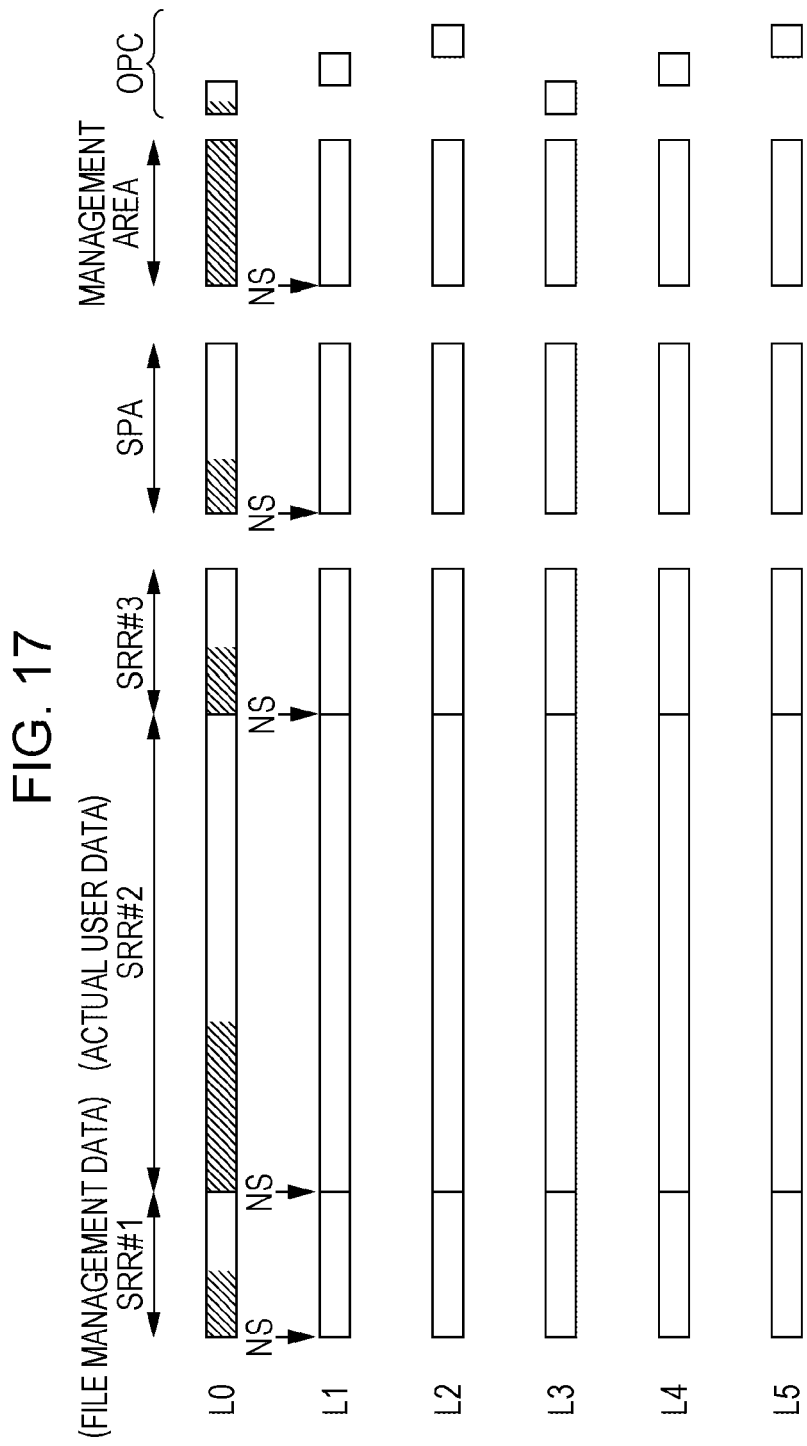
FIG. 17 is a view illustrating a case where an OPC area of a layer L0 according to the embodiment is used up.

FIG. 17 shows a case where the OPC area of the layer L0 is used up. In addition, for other areas, only the areas of the layer L0 are used.

The OPC area is used up and thereafter it is not possible to perform the OPC to the layer L0. Then, the controller 44 performs the process of Step F205. That is, recordable areas are still remained in the SRR#1, SRR#2, SRR#3, SPA and management area of the layer L0. However, by performing the closing process of the layer L0 and the transition process of each area as shown by the next recording start points NS, the recording target layer is changed to the layers L1 to L3.

According to this process, in the range of the layers L1 to L3, the proper recording operation including the OPC operation may be executed.

Moreover, in this case, by closing the SRR#2 of the layer L0 in the middle thereof, the recordable capacity of the user data also decreases. However, practically, by designing the size of the OPC area, it is considered that the case as described above rarely occurs.

Hereinbefore, the specific example executed by the control process of FIG. 12 has been described. To summarize this, the recording and reproduction apparatus 10 performs the following operation.

First, with respect to the multi-layer recording medium 1 in which three consecutive layers are arranged in such a manner that the OPC areas thereof are not overlapped with each other, the recording and reproduction apparatus 10 performs a recording process on a set of the three consecutive layers as the recording target layer. Accordingly, it is possible to respectively execute the OPC operation between the three layers at an arbitrary timing and to respectively execute the recording to the three layers at an arbitrary timing. Specifically, for each area shown in FIGS. 13 to 17, if layers having been recorded are different from each other, this is not problematic.

When the use of layers by the recording operation proceeds to the layer of the laser light incident surface side beyond the recording target layer, the most deeply positioned layer of the recording target layers when seen from the laser light incident surface side is set to be an unrecordable layer and the three consecutive layers including the layer to which the recording proceeds are set to be a new recording target layer.

According to this, as described in FIGS. 13 to 17, the proceeding to the layers is performed corresponding to the proceeding of the recording operation. Since the recording operation including the OPC operation is not performed to the layer at the depth side from the recording target layer at the time of changing the recording target layer, there is no problem related to the OPC operation. Moreover, since the most deeply positioned layer of the original recording target layers is set to be unrecordable, the loss of areas occurs. However, practically, as each case is described above, it is possible to prevent the loss of areas from becoming a big problem.

The recording and reproduction apparatus 10 sets three recording target layers to be a target by performing the recording control process of Step F200 and then executes the recording operation. This fact has an advantage in that the number or time of jumping between layers during recording can be reduced in the multi-layer recording medium 1 having six layers or the like.

6. Second Example of Recording Process

A second example of the recording process will be described with reference to FIG. 18.

In the first example of the recording process, when the recording operation proceeds to the layer of the front side beyond the recording target layer, unconditionally, the most deeply positioned layer of the recording target layers was set to be unrecordable and then the recording target layer was changed by adding a new layer.

The reason is that the recording operation including the OPC operation is not allowed to be performed to the layer at the depth side in which the OPC area thereof is overlapped with the OPC area of the layer newly added to the recording target layer.

However, for example, only the OPC operation using the OPC area of the layer L0 overlapped with that of the layer L3 is not preferable to be executed to the layer L0, after setting the layer L3 to be a new recording target layer. If the recording operation of the user data or the management data to the layer L0 is performed after that, this is not problematic.

In other words, during a period when the OPC operation is not necessary, there is no problem that the layer L3 is set to be a new recording target layer and then the recording is performed to the layer L0.

Figure 18:
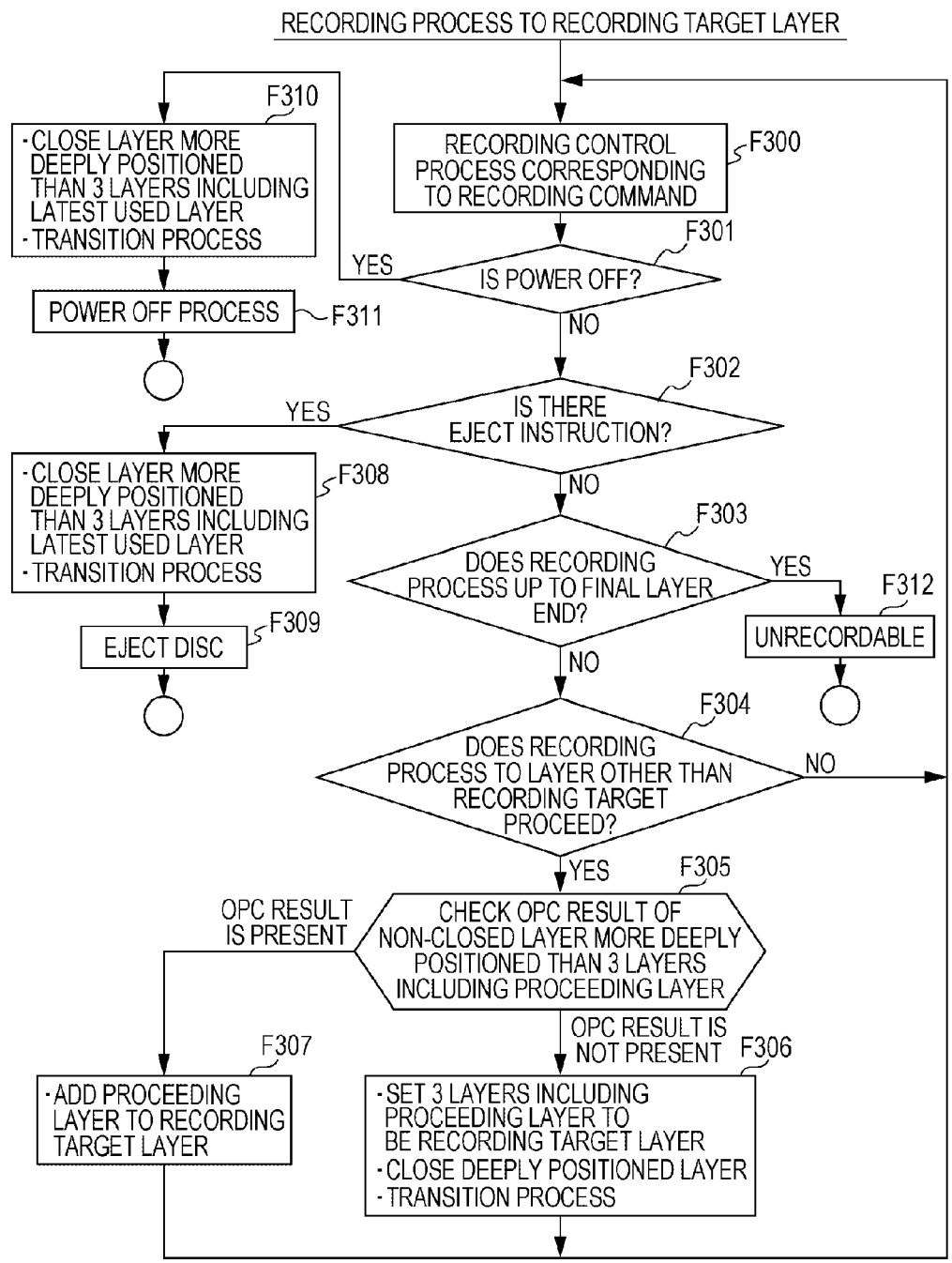
FIG. 18 is a flowchart of a second example of a recording process according to the embodiment.

In such a manner, the second example of the process as shown in FIG. 18 may be considered.

The controller 44 executes a necessary recording control process in Step F300 in response to a recording command from the host device and controls each unit shown in FIG. 5 so as to execute the recording operation. This is the same as Step F200 in FIG. 12 described above. As the recording control in Step F300, the controller 44 sets the recording target layers to be used from the most deeply positioned layer.

During a period when the recording control is performed at a desired time in response to a command or the like from the host device as Step F300, the controller 44 performs processed of Steps F301, F302, F303, and F304.

The controller 44 checks whether or not an instruction for turning off power is present in Step F301.

In addition, the controller 44 checks whether or not an instruction for ejecting a disc is present in Step F302.

Further, the controller 44 checks whether or not layers is used up to the final layer in Step F303. When it is detected that the recording areas are used up to the layer L5, which is the final layer, the controller 44 sets the subsequent layers to be unrecordable in Step F312 because it is not possible to perform the subsequent recording.

Furthermore, in Step F304, the controller 44 determines whether or not the recording operation executed by the control in Step F300 proceeds to a layer other than the recording target layer. When it determined that the recording operation does not proceed to a layer other than the recording target layer, the recording operation is continuously executed.

When it is determined that the recording operation proceeds to the layer of the front side beyond the recording target layer in Step F304, the controller 44 performs checking Step F305.

The process of Step F305 is a process to check whether or not OPC results (optimum laser power) with respect to one or a plurality of unclosed layers, which are positioned at the depth side from three layers including a layer to which the recording proceeds ahead, are respectively stored in the memory 47.

When the recording is performed to a certain layer after loading the multi-layer recording medium 1, the recording and reproduction apparatus 10 performs the OPC to the layer and thus detects the optimum laser power.

Therefore, for example, when the OPC was performed to the layer L0 after loading the multi-layer recording medium 1 and then the recording was performed, information on the optimum laser power of the layer L0 has been stored. In this case, for example, even after the recording proceeds to the layer L3, it is possible to perform the data recording to the layer L0 without performing the OPC.

Conversely, for example, it is assumed that if the layer L0 is not closed during loading and the layers L0, L1, and L2 are set to be the recording target layer at the initial stage of loading, there is a necessity that the OPC and the recording proceed to a certain area of the layer L3 without performing the OPC and the recording to the layer L0. In this case, the OPC is executed to the layer L3 before recording to the layer L3. However, in this case, the optimum laser power of the layer L0 is not stored. Accordingly, in this case, if the recording is performed to the layer L0 after that, it is necessary to perform the OPC to the layer L0. However, after performing the OPC to the layer L3, it is not possible to perform the OPC to the layer L0.

To address this circumstance, in Step F304, the controller 44 checks whether or not the optimum laser power of the OPC results with respect to an unclosed layer at the depth side from three layers including a layer to which the recording proceeds is stored and then branches processes.

When the optimum laser power of the layer at the depth side is not stored, the process proceeds to Step F306. The process of the Step F306 is the same process as Step F205 in FIG. 12.

That is to say, the controller 44 closes the most deeply positioned layer of the layers which are set to be the recording target layer at that time. In addition, a transition process of an area in which the subsequent recording is performed is carried out. Then, the recording target layer is changed. For example, the recording target layers are changed from the layers L0 to L2 to the layers L1 to L3. By performing this process, the recording control in Step F300 continues. For example, this operation is the same operation as described in FIGS. 13 to 17.

On the other hand, when the OPC result of the layer at the depth side as a target, in which checking the presence of the OPC result in Step F305 is carried out, is recorded, at this time, closing the layer at the depth side is not necessary. The reason is that it is possible to perform the recording without executing the OPC.

In this case, the process of the controller 44 proceeds to Step F307 and then a layer to which the recording proceeds ahead is added to the recording target layer.

Figure 19:
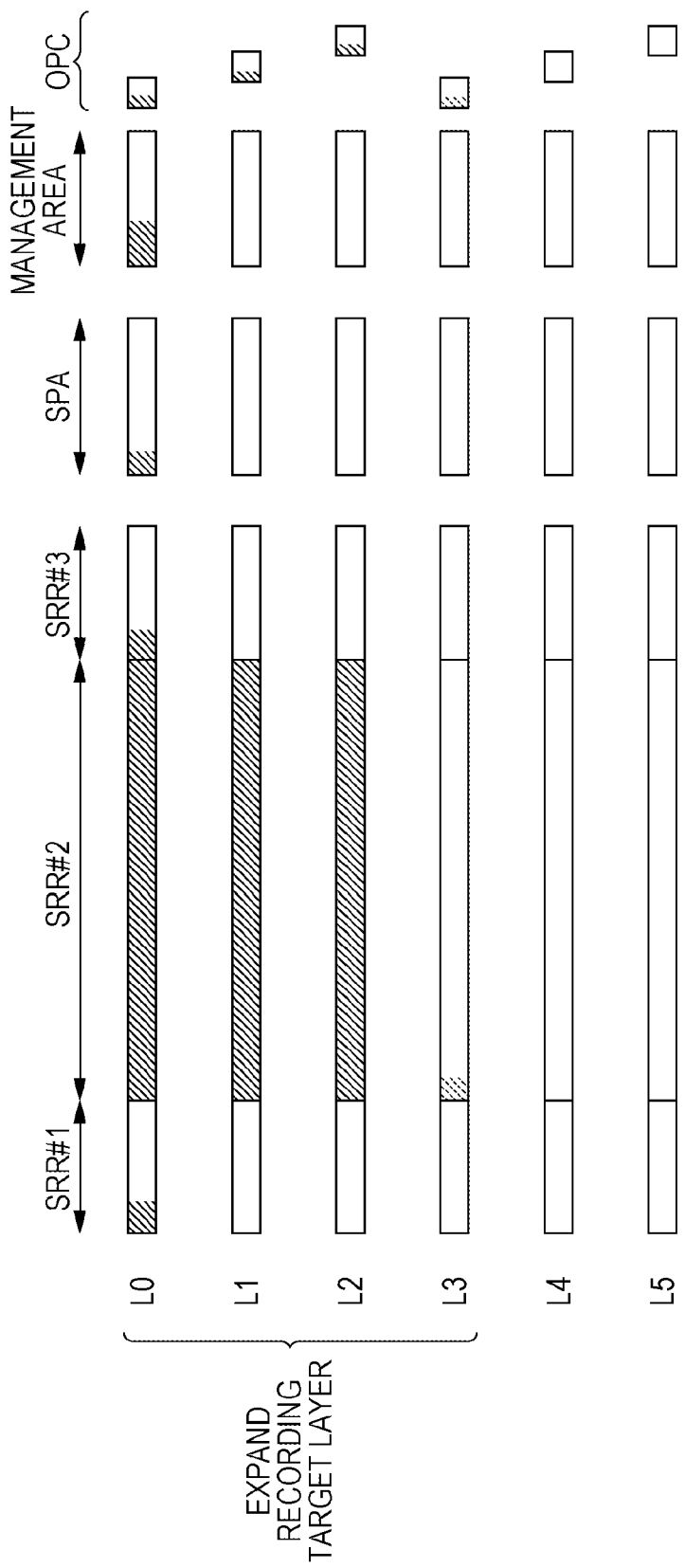
FIG. 19 is a view illustrating a case where the SRR#2 according to the embodiment is used beyond the recording target layer.

FIG. 19 shows an example of above-described case. For example, it is assumed that, the recording operation is performed to the layers L0 to L2 as the recording target layer at the initial stage, then the user data recording in the SRR#2 proceeds greatly and thus the recording is performed to the SRR#2 of the layer L3.

In this case, if the recording to any of the SRR#1, SRR#2, SRR#3, SPA, and management area of the layer L0 has been performed after loading the multi-layer recording medium 1, the OPC using the OPC area of the layer L0 is performed before the recording to the layer L0 and the value of the optimum laser power of the layer L0 is stored in the memory 47. If the value of the optimum laser power is stored, it is possible to execute the recording without performing the OPC to the layer L0.

That is to say, in this case, it is not necessary to close the layer L0.

When the optimum laser power of the layer L0 is stored, the recording target layer is changed to be expanded to four layers of the layers L0 to L3. By performing this process, the recording control in Step F300 continues.

In this case, after that, the control of Step F300 is executed to a range of the layers L0 to L3 as a target. Therefore, even after the recording is performed to the layer L3 in such a manner shown as a portion that is hatched with broken lines in a state as shown in FIG. 19, for example, it is possible to record the metadata in the SRR#1 and SRR#3 of the layer L0 or to update the management information by using the SPA of the layer L0 or the management area (TDMA) of the layer L0.

Figure 20:
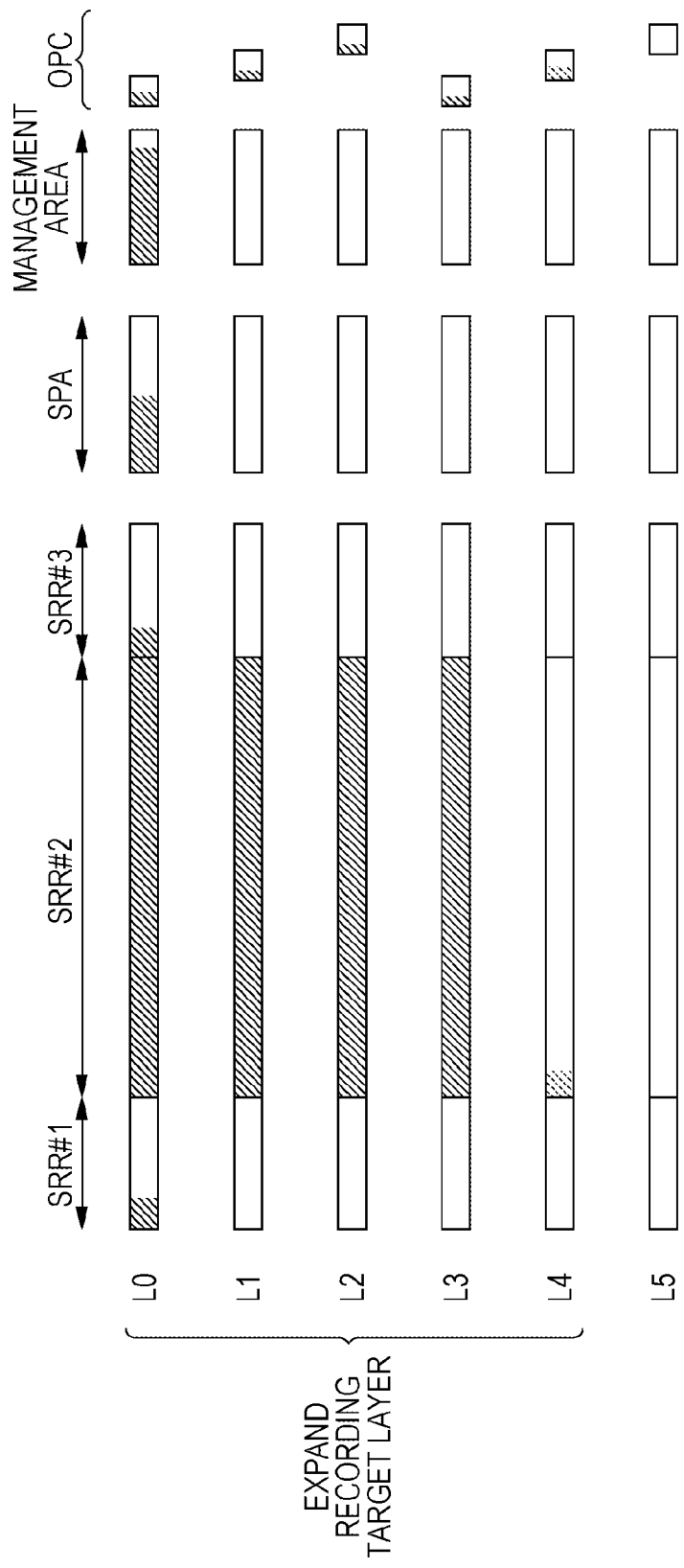
FIG. 20 is a view illustrating a case where the SRR#2 according to the embodiment is further used beyond the expanded recording target layer.

In this case, when the reading proceeds further and then the layer L4 is used as shown in FIG. 20, the presence of the OPC result of the layers L0 and L1 is checked in Step F305. When the OPC results of the layers L0 and L1 are stored, the controller 44 changes the recording target layer to be expanded to five layers of the layers L0 to L4 in Step F307.

By not excluding the layer, in which the recording can be performed without performing the OPC, from the recording target layer, it is possible to continue the recording operation by effectively using a memory area of the layer and to prevent capacity degradation.

Although not shown in FIG. 18, depending on the setting of the OPC operation execution timing, or the area setting and recording progress state of each layer, there are a plurality of layers at the depth side as a target, in which checking the presence of the OPC result in Step F305 is carried out. Moreover, it may be considered that there are cases where the OPC results of one part of the plurality of layers are stored but the OPC results of the other part of the plurality of layers are not stored.

In this case, with respect to layers in which the OPC results thereof are not stored, the controller 44 may perform the closing process or the transition process and add a layer to which the recording proceeds to the recording target layer. Meanwhile, with respect to layers in which the OPC results thereof are stored, the controller 44 may change the layers as the recording target layer such that the layers are put into the recording target layer.

As described above, in the processes of FIG. 18, any one of the processes of Steps F306 and F307 is performed depending on the determination in Step F305.

Only when a state where the recording can be performed without performing the OPC to the layer L0 or the like is continued, it is acceptable that the recording target layer is expanded in Step F307. When the multi-layer recording medium 1 is ejected and thereafter the multi-layer recording medium 1 is loaded on the recording and reproduction apparatus 10, it is necessary to perform the OPC to the layer L0. In addition, after turning off the power of the recording and reproduction apparatus 10 and losing the memory of the OPC result, it is also necessary to perform the OPC to the layer L0.

However, in this case, since the OPC area of the layer L3 which is overlapped with other OPC areas is used, it is not appropriate to use the OPC area of the layer L0.

In the process example of FIG. 18, when an instruction for ejecting is present, the process of the controller 44 proceeds to Step F308 from Step F302 and then performs the closing process and the transition process to the layer at the depth side from three layers including the latest used layer. Thereafter, the ejecting (disc discharging) of the multi-layer recording medium 1 is performed in Step F309.

Further, when an instruction for turning off power is present, the process of the controller 44 proceeds to Step F310 from Step F301 and then performs the closing process and the transition process to the layer at the depth side from three layers including the latest used layer. Thereafter, the power off process is performed in Step F311.

For example, as shown in FIG. 19, when the ejecting or turning off power is performed after the recording target layer is expanded and then the layer L3 is used, the transition process (management data update) in which a layer to be used next is set to be the layer L1 is performed even in a case where the closing process is performed to the layer L0 and an area having an unused portion is in the layer L0.

For example, as shown in FIG. 20, when the ejecting or turning off power is performed after the recording target layer is expanded and then the layer L4 is used, the transition process (management data update) in which a layer to be used next is set to be the layer L2 is performed even in a case where the closing process is performed to the layers L0 and L1 and areas having an unused portion is in the layers L0 and L1.

According to this, at the next recording operation, it is possible to avoid an inappropriate OPC from being performed.

As described above, in the second example of the recording process, the controller 44 performs the following process when the use of layers by the recording operation proceeds to the layer of the laser light incident surface side beyond the recording target layer.

When the laser power adjustment result is not obtained with respect to a layer, which is positioned at the depth side from the n consecutive layers including the layer to which the recording proceeds when seen from the laser light incident surface, the controller 44 sets the layer positioned at the depth side to be an unrecordable layer and sets the n consecutive layers including the layer to which the recording proceeds, to be a new recording target layer (Step F306).

On the other hand, when the laser power adjustment result is obtained with respect to the layer, which is positioned at the depth side from the n consecutive layers including the layer to which the recording proceeds when seen from the laser light incident surface, the controller 44 sets (n+1) or more consecutive layers from the layer positioned at the depth side to the layer to which the recording proceeds, to be a new recording target layer (Step F307).

According to this, there is an advantage in that it is possible to use the area of the layer at the depth side for recording without generating an unnecessary area and not to waste a memory capacity.

When (n+1) or more consecutive layers are set to be the recording target layer, the controller 44 performs a process to set the recording target layer positioned more deeply than the n recording target layers at the front side when seen from the laser light incident surface side to be an unrecordable layer, during discharging the multi-layer recording medium 1 or turning apparatus power off which is subsequently performed (Steps F308 and F310)

According to this, at the next recording operation, it is possible to avoid an inappropriate OPC from being performed.

7. Modification Example

Hereinbefore, the embodiments of the present disclosure have been described, but various modification examples and application examples may be considered in the present disclosure.

For the setting related on the OPC area arrangement, the "n" value or the layer number "m+1" may be considered in many ways. Particularly, in consideration of the efficient recording operation, recording capacity or the like corresponding to the number of layers, the usage type of the recording system, it is preferable that the "n" value be set to be a appropriate value.

The multi-layer recording medium 1 or the recording and reproduction apparatus 10 according to the embodiment is merely an example. The structure of the multi-layer recording medium 1 or the configuration of the recording and reproduction apparatus 10 may be considered in many ways.

In addition, the multi-layer recording medium 1 as an optical disc is exemplified, but a recording medium to which the present disclosure may be applied is not limited to an optical disc-shaped recording medium. For example, the present disclosure may be applied to a card-shaped recording medium or a recording apparatus corresponding thereto.

Here, the present disclosure may also adopt the following configurations.

(1) A recording apparatus including a recording unit that performs a recording operation to each layer by performing laser light illumination to a recording medium which has (n+1) or more layers as a recording layer and in which a test writing area of each layer is formed between at least n consecutive layers and at a position in which the test writing areas are not overlapped with each other when seen from a laser light incident surface side, and a controller that sets the n consecutive layers to be a recording target layer in the recording operation including a test writing for laser power adjustment and causes the recording unit to execute the recording operation to the n recording target layers, wherein n≥2.

(2) The recording apparatus according to (1), wherein the controller causes the recording unit to execute the recording operation in which layers are used in the order from a layer at the depth side when seen from the laser light incident surface side.

(3) The recording apparatus according to (1) or (2), wherein the controller sets the n consecutive layers including the most deeply positioned layer when seen from the laser light incident surface side, out of recordable layers, to be the recording target layer, and wherein the controller causes the recording unit to execute the recording operation in which layers are used in the order from a layer at the depth side with respect to the n recording target layer.

(4) The recording apparatus according to any one of (1) to (3), wherein, when the use of layers by the recording operation proceeds to the layer of the laser light incident surface side beyond the n recording target layers, the controller sets the most deeply positioned layer of the recording target layers when seen from the laser light incident surface side to be a unrecordable layer and sets the n consecutive layers including a layer to which the recording proceeds to be a new recording target layer.

(5) The recording apparatus according to any one of (1) to (3), wherein in a state where the use of layers by the recording operation proceeds to a layer of the laser light incident surface side beyond the n recording target layers, when a laser power adjustment result is not obtained with respect to the layer positioned at the depth side from the n consecutive layers including the layer to which the recording proceeds when seen from the laser light incident surface, the controller sets the layer positioned at the depth side to be an unrecordable layer and sets the n consecutive layers including the layer to which the recording proceeds, to be a new recording target layer, and when the laser power adjustment result is obtained with respect to the layer positioned at the depth side from the n consecutive layers including the layer to which the recording proceeds when seen from the laser light incident surface, the controller sets (n+1) or more consecutive layers from the layer positioned at the depth side to the layer to which the recording proceeds, to be a new recording target layer.

(6) The recording apparatus according to (5), wherein, when (n+1) or more consecutive layers are set to be the recording target layer, the controller performs a process to set the recording target layer positioned more deeply than the n recording target layers at the front side when seen from the laser light incident surface side to be a unrecordable layer, during discharging a recording medium or turning off power to the apparatus which is subsequently performed.

The present disclosure contains subject matter related to that disclosed in Japanese Priority Patent Application JP 2012-097548 filed in the Japan Patent Office on Apr. 23, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A recording apparatus comprising:
one or more processors operable to:
set a first group of n consecutive recording layers of a recording medium as recording target layers, wherein each of the n consecutive recording layers comprises a test writing area, wherein the recording medium comprises m+1 recording layers, wherein the recording medium comprises (m−n)+2 groups, wherein m≥n and n≥2, and wherein for the first group, a position of the test writing area of each of the n consecutive recording layers is non-overlapping with other of the n consecutive recording layers in a laser light axis direction; and perform a recording operation to record user data simultaneously on each of the n consecutive recording layers of the first group based on test writing on the test writing area of each of the n consecutive layers, wherein, in an event the recording proceeds to a new recording layer next to the n consecutive recording layers of the first group, as seen from a laser light incident surface side, the one or more processors are operable to close the recording of the recording layer positioned at a depth side as seen from the laser light incident surface side, of the n consecutive recording layers of the first group, and set a second group of n consecutive recording layers, comprising the recording layers of the first group other than the recording layer for which the recording is closed and the new recording layer, as new recording target layers.

2. The recording apparatus according to claim 1, wherein the one or more processors are operable to perform the recording operation such that the n consecutive recording layers are sequenced from the recording layer positioned at the depth side as seen from the laser light incident surface side to the laser light incident surface side.

3. The recording apparatus according to claim 1, wherein the one or more processors are operable to set the n consecutive recording layers including the recording layer positioned at the depth side as seen from the laser light incident surface side to be the recording target layers.

4. The recording apparatus according to claim 1, wherein, when a laser power adjustment result corresponding to the test writing area is not obtained with respect to the recording layer positioned at the depth side from the n consecutive recording layers, the one or more processors are operable to set the recording layer positioned at the depth side to be an unrecordable layer.

5. The recording apparatus according to claim 1, wherein, when (n+1) or more consecutive recording layers are set to be the recording target layers, the one or more processors are operable to set one or more recording layers positioned further away from the laser light incident surface side to be unrecordable layers, while ejecting the recording medium or turning off power to the recording apparatus.

6. A recording method comprising:

in a recording apparatus:

setting a first group of n consecutive recording layers of a recording medium as recording target layers, wherein each of the n consecutive recording layers comprises a test writing area, wherein the recording medium comprises m+1 recording layers, wherein the recording medium comprises (m−n)+2 groups, wherein m≥n and n≥2, and wherein for the first group, a position of the test writing area of each of the n consecutive recording layers is non-overlapping with other of the n consecutive recording layers in a laser light axis direction; and performing a recording operation to record user data simultaneously on each of the n consecutive recording layers of the first group based on test writing on the test writing area of each of the n consecutive layers, wherein, in an event the recording proceeds to a new recording layer next to the n consecutive recording layers of the first group, as seen from a laser light incident surface side, a recording operation of the recording layer positioned at a depth side as seen from the laser light incident surface side, of the n consecutive recording layers of the first group is closed, and a second group of n consecutive recording layers is set as new recording target layers, wherein the n consecutive layers of the second group comprises the recording layers of the first group other than the recording layer for which the recording operation is closed and the new recording layer.

7. A non-transitory computer readable medium having stored thereon, a computer program having at least one code section for controlling a recording apparatus, the at least one code section being executable by a computer for causing the computer to perform the steps comprising:

setting a first group of n consecutive recording layers of a recording medium as recording target layers, wherein each of the n consecutive recording layers comprises a test writing area, wherein the recording medium comprises m+1 recording layers, wherein the recording medium comprises (m−n)+2 groups, wherein m≥n and n≥2, and wherein for the first group, a position of the test writing area of each of the n consecutive recording layers is non-overlapping with other of the n consecutive recording layers in a laser light axis direction; and performing a recording operation to record user data simultaneously on each of the n consecutive recording layers of the first group based on test writing on the test writing area of each of the n consecutive layers, wherein, in an event the recording proceeds to a new recording layer next to the n consecutive recording layers of the first group, as seen from a laser light incident surface side, a recording operation of the recording layer positioned at a depth side as seen from the laser light incident surface side, of the n consecutive recording layers of the first group is closed, and a second group of n consecutive recording layers is set as new recording target layers, wherein the n consecutive layers of the second group comprises the recording layers of the first group other than the recording layer for which the recording operation is closed and the new recording layer.

8. The recording apparatus according to claim 1, wherein the one or more processors are operable to perform the test writing on the test writing area of each of the first and the second group of n consecutive recording layers for laser power adjustment while recording.

9. The recording apparatus according to claim 1, wherein the one or more processors are operable to perform a tracking servo operation while performing the test writing in the test writing area of each of the first and the second group of n consecutive recording layers.

10. The recording apparatus according to claim 1, wherein the one or more processors are operable to check a status of the recording medium to be subjected to sequential recording based on information provided in a temporary disc management area of the recording medium.

11. The recording apparatus according to claim 10, wherein the one or more processors are operable to not perform the recording operation when the status indicates that one or more of the recording target layers of the recording medium are in an unrecordable state.

12. The recording apparatus according to claim 1, wherein each of the n consecutive recording layers comprises a main data area, a management area, and a spare area.

13. The recording method according to claim 6, further comprising performing the test writing on the test writing area of each of the first and the second group of n consecutive layers for laser power adjustment while recording.

14. The recording method according to claim 6, further comprising checking a status of the recording medium before setting the first group of n consecutive recording layers as the recording target layers.

15. The recording apparatus according to claim 1, wherein each recording layer of the recording target layers comprises a main data area which is divided into at least three tracks in which one of the tracks is used to store user data, wherein the one or more processors are operable to continue recording on the one of the tracks when the user data recorded on the one of the tracks proceeds beyond the recording layer.

16. The recording apparatus according to claim 1, wherein a position of the test writing area of the new recording layer is identical to a position of the test writing area of the recording layer for which the recording is closed.

17. The recording apparatus according to claim 1, wherein positions of the test writing areas of each of the n consecutive layers of the first group is identical to positions of test writing areas of each of n consecutive layers of (n+1) group.

* * * * *